United States Patent
Kasargod et al.

(10) Patent No.: US 9,235,644 B2
(45) Date of Patent: Jan. 12, 2016

(54) OPERATOR, DEVICE AND PLATFORM INDEPENDENT AGGREGATION, CROSS-PLATFORM TRANSLATION, ENABLEMENT AND DISTRIBUTION OF USER ACTIVITY CATALOGS

(75) Inventors: Kabir Kasargod, San Diego, CA (US); Tianyu L. D'Amore, San Diego, CA (US); Gabriel Moura Da Silva, San Diego, CA (US); Brian Minear, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 522 days.

(21) Appl. No.: 12/484,186

(22) Filed: Jun. 13, 2009

(65) Prior Publication Data

US 2010/0063969 A1 Mar. 11, 2010

Related U.S. Application Data

(60) Provisional application No. 61/080,435, filed on Jul. 14, 2008.

(51) Int. Cl.
*G06F 17/30* (2006.01)
*G06Q 30/02* (2012.01)

(52) U.S. Cl.
CPC .... *G06F 17/30867* (2013.01); *G06F 17/30699* (2013.01); *G06Q 30/02* (2013.01)

(58) Field of Classification Search
CPC .............. G06F 17/30867; G06F 17/30699; G06Q 30/02
USPC .............. 707/740, 999.002, 732, E17.109
See application file for complete search history.

(56) References Cited

U.S. PATENT DOCUMENTS

| | | | |
|---|---|---|---|
| 5,724,262 A | 3/1998 | Ghahramani | |
| 6,064,980 A * | 5/2000 | Jacobi | G06Q 30/06 705/1.1 |
| 6,393,115 B1 * | 5/2002 | Krauss | H04L 12/6418 379/201.01 |

(Continued)

FOREIGN PATENT DOCUMENTS

| JP | 9237233 A | 9/1997 |
|---|---|---|
| JP | 2004054381 A | 2/2004 |

(Continued)

OTHER PUBLICATIONS

International Search Report and Written Opinion—PCT/US2009/049900—International Search Authority—European Patent Office—Dec. 7, 2010.

(Continued)

*Primary Examiner* — Phong Nguyen

(74) *Attorney, Agent, or Firm* — Muncy, Geissler, Olds & Lowe, P.C.

(57) ABSTRACT

Implementations relate to generating an operator, device, and platform-independent aggregation, cross-platform translation, enablement, and distribution of user activity catalogs. Users of a cellular telephone, a personal computer, or other devices or services can register to a database that collects transaction and other activity for the user. The user can designate one or more groups of users with whom to share collective activity data. The activity feeds can include recommendations, transactions, and other information generated when group members conduct retail or other activity. In one example, the activity feeds transmitted can be automatically translated and configured based on service operator and/or recipient device type. In another example, a user visiting a Website can be presented with a context-sensitive drop-down list of transactions conducted at that site by members of user's designated group(s) in the past. The platform permits users to mutually and transparently suggest products, services, or content to each other.

65 Claims, 10 Drawing Sheets

(56) References Cited

U.S. PATENT DOCUMENTS

| | | | |
|---|---|---|---|
| 8,010,418 B1 * | 8/2011 | Lee | G06Q 30/02 705/26.7 |
| 2001/0021914 A1 | 9/2001 | Jacobi et al. | |
| 2003/0028451 A1 * | 2/2003 | Ananian | G06F 17/30867 705/26.42 |
| 2003/0088413 A1 * | 5/2003 | Gomez | G10L 15/22 704/246 |
| 2003/0096621 A1 * | 5/2003 | Jana | G08G 1/0104 455/456.1 |
| 2005/0059384 A1 * | 3/2005 | Kuusinen | H04M 1/575 455/414.1 |
| 2005/0234781 A1 * | 10/2005 | Morgenstern | G06Q 30/00 705/14.16 |
| 2006/0059225 A1 * | 3/2006 | Stonehocker et al. | 709/202 |
| 2007/0060136 A1 | 3/2007 | Ramer et al. | |
| 2007/0061229 A1 | 3/2007 | Ramer et al. | |
| 2007/0061244 A1 | 3/2007 | Ramer et al. | |
| 2007/0073837 A1 * | 3/2007 | Johnson-McCormick | G06F 17/30038 709/217 |
| 2008/0133336 A1 * | 6/2008 | Altman et al. | 705/10 |
| 2008/0134042 A1 | 6/2008 | Jankovich | |
| 2009/0018929 A1 * | 1/2009 | Weathers, Jr. | 705/27 |

FOREIGN PATENT DOCUMENTS

| | | |
|---|---|---|
| JP | 2005174094 A | 6/2005 |
| JP | 2006059257 A | 3/2006 |
| JP | 2007094492 A | 4/2007 |
| JP | 2007317177 A | 12/2007 |
| KR | 20060069061 A | 6/2006 |
| KR | 100785361 B1 | 12/2007 |
| KR | 20070121211 A | 12/2007 |
| KR | 20080043140 A | 5/2008 |
| RU | 2317585 C2 | 2/2008 |

OTHER PUBLICATIONS

Supplementary European Search Report—EP09798577—Search Authority—Munich—Mar. 22, 2012.

* cited by examiner

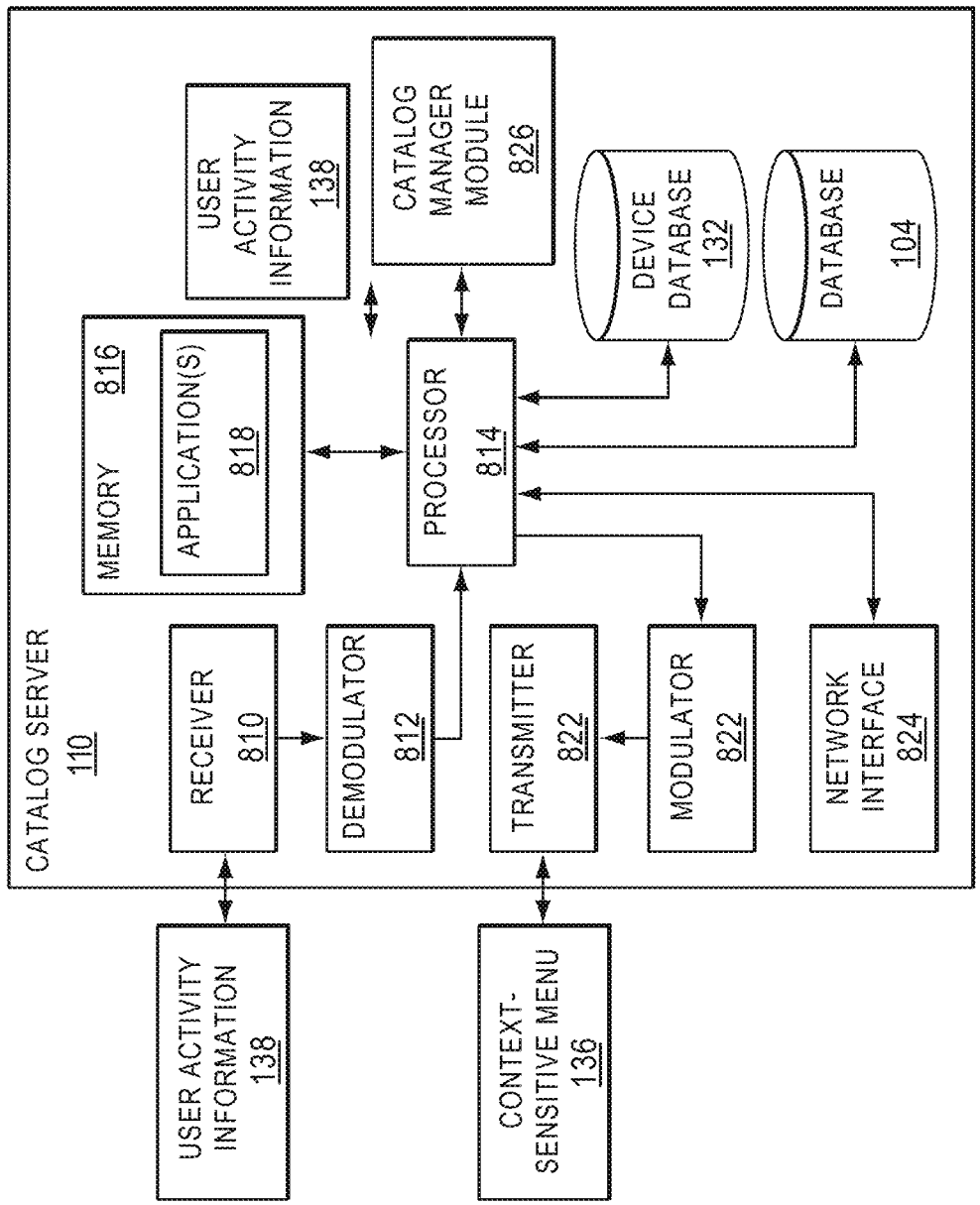

OPERATOR, DEVICE AND PLATFORM INDEPENDENT AGGREGATION, CROSS-PLATFORM TRANSLATION, ENABLEMENT AND DISTRIBUTION OF USER ACTIVITY CATALOGS

CROSS-REFERENCE TO RELATED APPLICATIONS

The present application relates to U.S. Provisional Application No. 61/080,435 filed Jul. 14, 2008, entitled "Method and Apparatus for Aggregation and Distribution of User Activity Catalogs," by Kabir Kasargod, Tianyu D'Amore, Gabriel M. Da Silva, and Brian Minear, assigned or under obligation of assignment to the same entity as this application, from which provisional application priority is claimed, and which provisional application is incorporated by reference herein.

BACKGROUND

The present teachings relate generally to method and apparatus for the operator, device, and platform-independent collection, and cross-platform translation, and distribution of user activity catalogs.

The advent of the Internet, network-enabled cellular telephones, and other networked devices has spawned a new era of advertising and content delivery. One factor spurring the increase in online advertising and other content delivery is the potential for targeted marketing to cell phone, Internet, and other users. Search-based advertising, for instance, has proliferated, in which content related to a user's search topic is automatically inserted in selectable banner ads or other advertising media.

Despite the widespread adoption of cellular and Internet advertising and other media, certain barriers to the effectiveness of networked content delivery remain. One factor is that consumers do not tend to give as much consideration to network-generated advertising content as they do to the recommendations or experiences of their immediate friends and other acquaintances. Traditional advertising platforms and channels generally fail, however, to exploit the marketing power of peer-reported recommendations and experiences.

Cellular and Internet providers and operators around the world, for example, offer services and devices that support the browsing, purchase, and download of games, ringtones, wallpapers, screensavers, music, and other types of DRM-protected services or content. DRM-protected content is generally purchased through a shopping catalog that is managed by the operator and made available to the user via either the mobile or the operator's website. The catalog tries to differentiate and promote some pieces of content over others, generally without regard to the user's preference, but rather based on the operator's partnerships with content developers. Commercial catalogs themselves do not, however, provide the credibility and personal connection that the user is most easily able to relate to, and in general those catalogs are not tailored by user preferences and/or preferences and experiences of the user's social group. Those accumulated experiences can therefore remain hidden from mutual members of the group. Although inference based-catalogs and user recommendations have begun to be supported, the catalogs are still operator-controlled, the one-off recommendations tend to not be sufficient to cause a significant revenue impact, and the catalogs themselves do not provide the credibility or personality to which the user is able to relate easily.

It may be desirable to provide platforms and techniques that harness the leveraging effect of allowing users to accumulate and freely share their experiences and recommendations to other network users and that allow operators, merchants, and others to monetize those compounded content feeds. It may be further desirable to provide an ability to generate and distribute those feeds to various group members on a context-sensitive and/or device-independent basis, since in certain regards, the membership group can have a set of diverse handsets and other devices.

SUMMARY

According to the present teachings in one or more aspects, systems and methods for operator, device, and platform independent, cross-platform translation, enablement, and distribution of user activity catalogs are provided, in which users such as cellular telephone, Internet, or other users can agree to have their transaction and other activity captured to a combined database. In one or more implementations of the present teachings, systems and methods are provided which capture a catalog of user activity or experiences for each user registered, to participate in a shared database of activity histories. In one or more implementations, each user in a set of registered users can be any one or more of a cellular telephone user, a personal computer user, a user of a network-enabled media playback device, or other user or subscriber.

In one or more implementations, the user activity captured and recorded to the database can include, for example, purchase, license, or other transaction activity for the user. For instance, the catalog of user activity can include a record of purchases made by a user via the Internet and/or cellular telephone, or by in-store or point-of-sale purchases at stores or other retail sites. The transaction activity can involve, for example, the purchase, rental, or licensing of book, music, movie, clothing, food, software, or other media or content being recommended in the feed, and that has been translated to be relevant to the receiving user, and/or other products or services. In one or more implementations, the users receiving a feed of recommendations or other information from within their registered group or other participating community can be presented with an option to purchase the same product, service, or content being recommended in the feed. In one or more implementations, the option to purchase the recommended product can be a one-click interface, to permit convenient transactions by the user's linked "buddies," or other designated group(s).

In one or more implementations, the delivery of the shared-experience feeds can be generated and/or translated on a device-independent or cross-platform basis, permitting diverse devices to capture and upload new transactions, recommendations and experiences, and receive the same feeds, without a need for a given device to translate the format of the content for local presentation on that device. In one or more implementations in further regards, the presentation of various click-through options can be generated on a context-sensitive basis, for example, to display peer-recommended movies for purchase when the user navigates to a video rental page or theater schedule page.

In one or more implementations, the content feed received by the friends or other users can relate to a non-purchase activity, but the platform can nevertheless generate or translate that information into a purchasable activity. For example, a user might recommend a certain golf course and incorporate that recommendation into their catalog of user activity. When that recommendation is placed into a feed or distribution to the user's "buddies" or other designated group(s), selectable purchase options for golf clubs or other sporting equipment can be inserted into the feed. In one or more implementations, selectable purchase options can also be inserted for feeds which already include user transactions and/or recommendations, and can for instance include sponsored feeds from participating merchants or vendors. In one or more implementations, the selectable purchase options that are not derived from user recommendations or experiences can be marked or designated as merchant-sponsored options or recommendations.

According to one or more aspects, platforms and techniques according to the present teachings can thereby permit a user to share or link their catalog of accumulated user activity to one or more designated group or groups of other registered users, on a selective basis. In one or more implementations, the designated group(s) of other registered users can include a social network or other defined user community. In one or more implementations, the user can be identified by credentials, such as the user's cellular telephone or Internet credentials including identifiers such as a user name, password, cellular telephone or other account number. In one or more implementations, the user can configure an access profile which permits all users within a designated group or groups to receive the same content from the user's catalog of user activity, or different levels, types, or amounts of content from the user's catalog by configuring access policies for the catalog. In one or more implementations, the designated group or groups can view or discover, for example, the transaction history of the user to identify recent purchases by that user, such as recent music or video purchases or rentals. In one or more implementations, members of the designated group(s) can be presented with a selectable option, such as a button or box selectable by cursor or mouse click, or other dialog or interface to select that music, video, or other content for purchase themselves. In one or more implementations, the database hosting the set of catalogs of user activity can record the click-through or selection of material for purchase based on the user activity feed, for instance to record loyalty points or other promotional data.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The accompanying drawings, which are incorporated in and constitute a part of this specification, illustrate aspects of the present teachings and together with the description, serve to explain principles of the present teachings. In the figures:

FIG. 9 illustrates an exemplary set of hardware, software, and other resources in a base station and associated components, according to one or more implementations of the present teachings.

DETAILED DESCRIPTION

Figure 1:
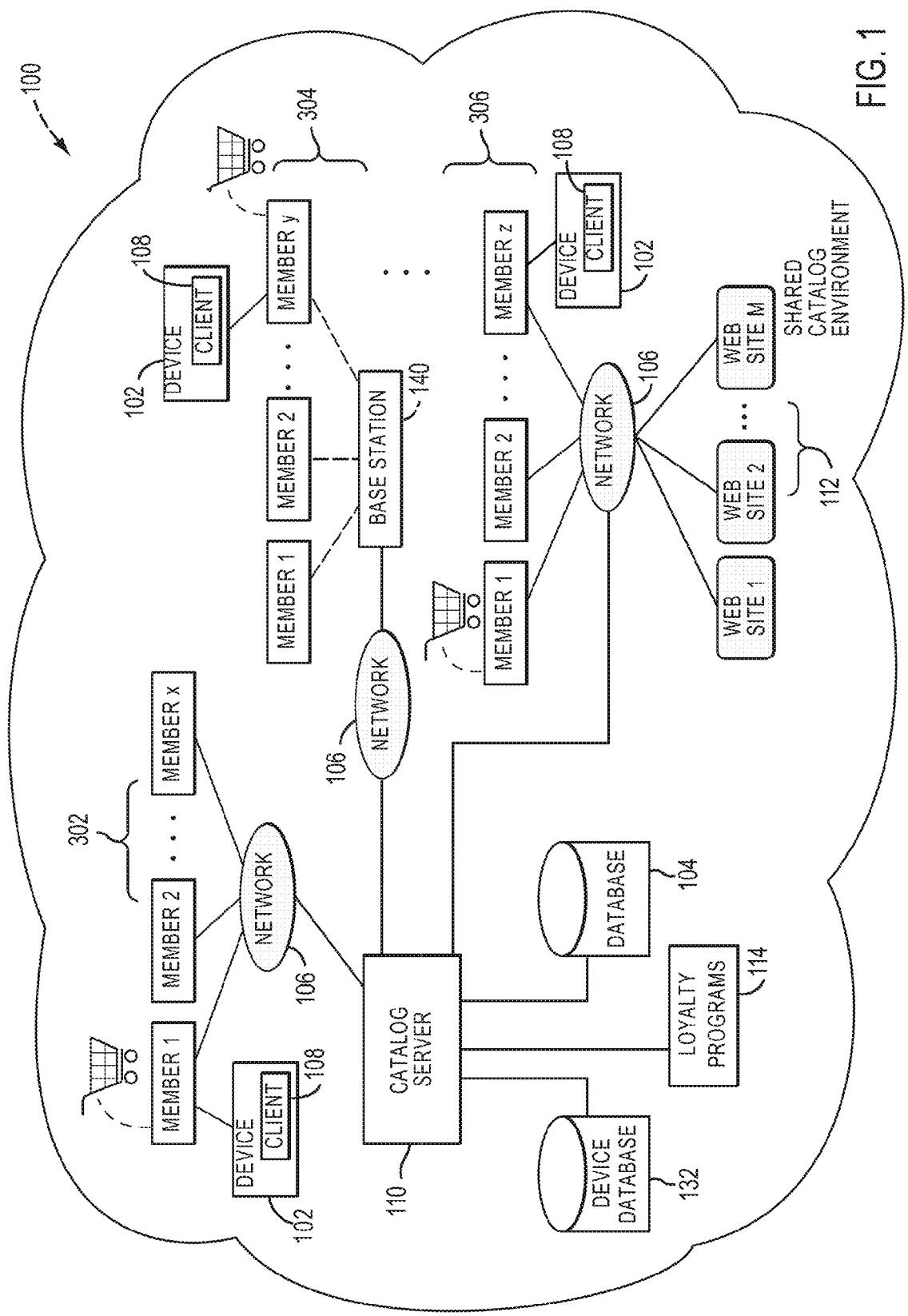
FIG. 1 shows an overall network platform supporting a shared-catalog environment for the platform-independent aggregation, cross-platform translation, enablement and distribution of catalogs of user activity, consistent with one or more aspects of the present teachings.

Various aspects are now described with reference to the drawings. In the following description, for purposes of explanation, numerous specific details are set forth in order to provide a thorough understanding of one or more aspects. It may be evident; however, that such aspect(s) may be practiced without these specific details.

Aspects of the present teachings relate to methods and apparatus for the operator, device, and platform-independent distribution of user activity catalogs. More particularly, in one or more aspects, platforms and techniques are provided in which users can agree to have their transaction records or other activity or experiences captured and stored to a shared database, for collection and selective distribution or sharing to designated group(s) of users within the overall set of registered users of the platform. The transaction, ratings/recommendation, and other histories and experiences of all users can therefore become available and transparent to each other depending on user-defined permissions, allowing the compounding effect of peer recommendations and experiences to be exploited in user-generated activity feeds. Consistent with one or more implementations, the feeds can be accessed, translated, and delivered on a cross-platform and/or operator, device and platform-independent basis, permitting a wide range of users to employ a wide range of devices to participate in the user-generated content streams. In one or more implementations, translations between various formats for a given recipient device and/or its supporting operator can be generated at the catalog server.

According to one or more implementations in one regard, a user can, in general, contribute to, view, or explore the set of catalogs of user activity in his or her designated group(s). The designated group(s) of a user can include, for example, friends, contacts, or other users within a "buddy" list, social network, and/or other user community. In one or more implementations, a user can choose to import or merge an existing list of users from a social network into the user's designated group(s). In one or more implementations, other users who are not registered to a specific social network can be included in a user's designated group(s). For example, a user can choose to include users or groups of users from their workplace, school, or other institution, community, or source, or can choose to invite participation from any public Internet or other network users. In one or more implementations of the present teachings, the designated group(s) for a user can be freely modified by the user at any time. In one or more implementations, a user can maintain one group or multiple groups. If multiple groups are generated, the user can designate groups having an overlap of users between separate groups, if desired. In one or more implementations, different designated groups or users within designated groups can be assigned the same or different content feeds, access privileges, or other distribution settings. In one or more implementations, groups can be established across platforms, carriers, or access providers. In one or more aspects, the user can configure a set of access or privilege controls to selectively opt in, opt out, filter, suspend, or activate the sharing of their transaction activity and other data to the shared catalog environment, at the user's discretion.

In the subject description, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

As shown in FIG. 1, according to one or more implementations in general regards, the user can operate a device 102 to access a database 104 and catalog server 110 via one or more network 106, and thereby participate in an overall shared-catalog environment 100. In one or more implementations, device 102 can be or include a cellular telephone, a personal computer, a network-enabled media player, a network-enabled personal digital assistant, a desktop or laptop computer, or other wired, optically-connected, wireless, or other networked device. Device 102 can host a client 108, such as a software application designed for a cellular telephone or other type of device 102, and configured to permit interaction with database 104, catalog server 110, and other resources. Client 108 can be or include, for instance, a client designed for BREW® platform available from QUALCOMM Incorporated of San Diego, Calif. Client 108 can likewise be or include a client designed for environments such as the Java™ 2 Mobile Environment (J2ME), the Wireless Application Protocol (WAP), or the Mobile Widget environment, etc. Client 108 can also be or include software for a personal computer, such as a Web browser, or other application or plug-in software module for the Windows™, Linux™, or any other network-aware environment. In one aspect, for instance, client 108 can likewise be or include a device such as a cable-enabled set-top box. One or more network 106 through which device 102 and client 108 or other associated hardware, software, or logic communicate with database 104 and other resources can be or include the Internet, or other public or private networks. In one or more aspects, network 106 can include or interface with one or more base station 140, such as a cellular base station, to communicate with wireless devices. In one or more implementations, a user can use more than one type of device 102 and/or client 108 at the same time or different times.

A catalog server 110 can maintain or interface with database 104. Database 104 can be a relational database or other data store that registers or stores catalogs of user activity, such as mobile or transaction activities that users choose to publicize to their designated group(s) of other users. In one or more aspects, catalog server can likewise maintain or interface with device database 132 storing configuration data for different types of device 102, client 108, and/or other resources.

In one or more implementations, the users can build their desired designated group(s) by manually enumerating users they wish to join their group(s). FIG. 1 depicts, purely illustratively, a designated group 302, a designated group 304, and a designated group 306, but any number, type, and arrangement of groups can be used. In one or more implementations, the designated group(s) for a user can also or instead be imported or merged from a social network, such as the publicly available Facebook™ or other service, to leverage any existing "buddy" network that the user maintains via external social networks. In one or more implementations, a user can designate all registered users in shared-catalog environment 100 as their designated group, or can designate subsets of that entire community as desired. In one or more implementations, the identity of designated group(s) for each user can be stored in database 104, or other data stores. In general, the designated group(s) for one user need not be identical to the designated group(s) for another user, although in one or more implementations, users can choose to establish or share common groups. In one or more implementations, the service of publishing a user's activity and feeds can be provided free of cost to the user. In implementation, database 104 can be integral with catalog server 110, or in another implementation, the database 104 can be independent and/or physically separated from catalog server 110. In one or more implementations, catalog server 110, base station 140, device database 132, database 104, and/or other resources can be located or hosted at a site operated by a carrier, operator, service, or other provider, or can be located or hosted within one or more network 106 or other locations.

The systems and methods for operator, device and platform-independent distribution of user activity catalogs of the present teachings can allow carriers, merchants, content providers, and other vendors or participants to introduce premium content which users can publicize to their designated group(s). Premium content can be downloadable content such as ringtones, wallpapers, applications, video clips, music, etc, as well as everyday content sold by brick-and-mortar and/or online retailers, vendors, or merchants (e.g., such as Wal-Mart, Amazon, eBay etc.), etc. One potential source of revenue for implementations of the present teachings can derive from vendors who promote premium content within the catalog distribution environment. A vendor can, for example, be or include a wireless carrier, or a retail merchant. According to one or more implementations in one regard, catalog server 110 can register and track the number of clicks that a user generates on each item or service that is vended by a participating vendor, and can charge the vendor a pre-specified rate for the downstream user clicks on the vendor's items initiated from user feeds.

In one or more implementations, the type of content delivered via a feed to or from a user can be filtered or configured according to user-configured settings, and/or the network or networks in which they are supported, subscribe, or operate. For example, a user can configure the user's received feeds to be filtered by the user's present location, such as a Global-Positioning System (GPS) fix reported by device 102, etc. A user can in these regards limit the set of selectable purchase options the user wishes to receive to those located within a certain number of miles of the user's present location. It may also be noted that in one or more implementations, and as described herein including in connection with FIGS. 3 and 4, the feeds or other content delivered to device 102 can be modified or adjusted to conform to the specifications or limitations of an operator and/or the particular device 102 or to ensure compatibility with the user's service and/or device 102, such as for example to reduce the video resolution of content transmitted to device 102, or perform other adjustments.

In one implementation, for instance, a wireless carrier's digital content can only be made selectively visible or available to a user if the user and the members of the user's designated group(s) belong to the same carrier. If the user and the designated group(s) belong to different carriers, feeds that promote a different carrier's digital content can be filtered out of, or otherwise adjusted, in the user's feed list. In one or more implementations in these regards, only non-carrier-specific premium content feeds can be made visible or available to the user from the user's designated group(s). Other types and combinations of content filtering may further be possible. However, according to one or more aspects, the delivery of content feeds can be made and filtered on an operator (or service) independent basis, so that users across different supporting operators can receive content feeds across different catalog databases and user groups, as described herein.

According to one or more implementations in another regard, and as described herein (including below in connection with FIG. 6), a set of Web sites 112 can be configured to generate and present context-sensitive lists or menus of available catalogs of user activity and/or related user feeds. The context-sensitive content feeds can be generated based on registration of the set of Web sites 112 to database 104 via catalog server 110, along with associated user activity and mappings from Web addresses or other navigation information. In one or more implementations, and as likewise shown in FIG. 1, catalog server 110 can communicate with a set of loyalty programs 114 to register and track earned challenge points, rewards, loyalty points, or other value. Set of loyalty programs 114 can be hosted or maintained, for instance, by third party providers such as merchants, vendors, retailers, or financial institutions.

According to one or more implementations in these regards, the catalog server 110, database 104, and other infrastructure and logic of the catalog-sharing environment 100 can be adapted to allow users demonstrating common interests to add each other to each other's designated group(s), e.g., as "buddies," to view each other's catalogs, and strengthen and broaden their relationships and shared experiences over time. In terms of storage of a user's catalog of user activity stored in database 104, each user can have a tracked number of pieces of content that the user has made publicly available in database 104. For each user, database 104, catalog server 110, and/or other software or logic can sort the stored data hosted in database 104 for instance to identify users with the highest number of content that is common with the user, and provide the user with a list of the most like-minded users.

For example, database 104 can be sorted or a report can be generated to indicate those users who have frequented a given user's favorite or most-visited restaurant the greatest number of times. In one or more implementations, the like-minded user list can be displayed within the shared-catalog environment to the user, for instance via client 108 on device 102. The user can then be presented with options such as an option to add the like-minded user as a member of the user's designated group(s) for sharing catalog content, view the buddy's catalog, and/or make purchases through or with the like-minded user. The shared-catalog environment 100 of the present teachings can likewise be used to facilitate joint purchase activity amongst multiple users, for instance via a shared "wish list," gift registry, or other information.

According to implementations in a further regard, the shared-catalog environment 100 of the present teachings can be extended to include retail merchants or other vendors in the users' designated group(s). This extension permits the expansion of recommended or available products, services, and content to the retail catalogs of merchants. In one or more implementations, merchants can join a user's designated group(s) as a node or virtual user. In this manner, a user can add merchants to the user's designated group(s), and purchase products, services, or content through the merchant's catalogs. In one or more implementations in these regards, the user can, for example, complete the purchase of retail or other items through payment mechanisms such as payment via mobile banking accounts, operator billing, and/or through the use of his/her credit card or other payment account in partnership with the participating merchant. In one or more implementations, the user can be incentivized through loyalty points from the owner or operator of database 104 or other entity to make public or broadcast his/her wish list items, as well as purchased items if desired.

In one or more implementations, it may be noted that the merchant catalogs as well as records of historical purchases need not necessarily be captured or transmitted via device 102 in the form of a cellular telephone or personal computer, for example. A retail store, for instance, acting as a virtual user, can store daily transactions on a local data processing platform in that store or other site, and upload transactions via the one or more network 106 (e.g., the Internet, etc.) to database 104, or other data store. The point-of-sale transaction captured in this manner can be conducted, for example, using cash or electronic payment. In one or more implementations, each participating merchant can designate all of its existing account holders, customers, or other subscribers or affiliates as "buddies" or members of the merchant's designated group(s), within the shared-catalog environment 100.

In one or more implementations in further regards, a user can configure or register to receive feeds or distributions of the set of catalogs of user activity, but decline to capture their own transaction activity to the database 104 and/or publish that activity to other users. In one or more implementations, a user can opt to capture and/or publish a transaction on a one-time basis, and/or to be queried to capture and/or publish their transactions one at a time on an ongoing transaction-by-transaction basis. In one or more implementations, a user can opt to capture, retrieve, and publish one or more transactions at any time, including for instance contemporaneously with the transaction, or some predetermined time after the transaction has taken place. In one or more implementations, a user can selectively opt at any time to capture and publish only those transactions conducted at or with one or more specific merchant, vendor, or content provider. In one or more implementations, a user can opt to have their transaction or other activity captured and published automatically for all available merchants, vendors, or content providers that are registered to or participating in the shared-catalog environment 100. In further implementations, the user can opt to selectively capture and publish offline activities such as transactions made at a physical store or other point of sale. The user in these regards can choose to add information links (e.g., a Web Uniform Resource Locator (URL), etc.) to the purchase or other transaction, or to the store, merchant, or provider. If a user adds a merchant to the user's designated group(s), the user is conversely able to view that merchant's catalog within the shared-catalog environment, for example via a display on device 102.

After insertion into the user's catalog of user activity, the user's designated group(s) can then now view the item (purchased item, wish list item, or other) in the user's catalog. Members of the designated group(s) can then add these items in their own wish list if desired, or purchase the item directly through or for the initial user. Again, transactions through the shared-catalog environment 100 can be tied back to the operator's or carrier's monthly or other bill, through mobile banking services, through the user's inputted credit card, through any online payment agency such as Paypal™ (e.g., where Paypal™ could for instance be a node or user within the shared-catalog environment, etc.), a credit card chip embedded within the cellular telephone if used, or other payment or settlement techniques. In one or more implementations, the owner or operator of database 104 can receive a revenue share for every purchase or other transaction conducted in the shared-catalog environment.

According to one or more implementations in a further regard, in addition to allowing members of a user's designated groups(s) to individually explore the catalog of user activity for that user, the shared-catalog environment of the present teachings can in addition or instead be configured to allow a user to broadcast or "blast" their catalog to the user's designated group(s). For example, according to one or more implementations in these regards, the user can automatically transmit a product, service, content or other catalog recommendation to one or all of the user's "buddies." In one or more implementations, the user can be provided with the flexibility of selecting or scheduling which users in the user's designated group(s) will receive the catalog broadcast or blast—whether one, some, or all users within the designated group(s), or others. In one or more implementations, a notification of the broadcast and/or the broadcast itself can be displayed within a specific area of the home page of the recipient users. In one or more implementations, that display can include the product, service, or content name or other identifier, the broadcasting user's rating of the product, service, or content, and a selectable link for the recipient user to purchase or explore that item.

In one or more implementations, the broadcast can relate to a specific product, service, or content, a selected group of such items, or a promotion of the broadcasting user's entire catalog of user activity. If the broadcast is referring to a complete catalog of user activity, clicking the associated link can take the recipient to the broadcasting user's catalog. The recipient user can for instance choose to ignore the broadcast, store it, delete it, or use it to purchase the product or go to the sending user's catalog. If ignored, in one or more implementations the broadcast can be kept in a "blast" list appearing in the recipient user's homepage without deleting it. If deleted, the broadcast can be removed from the recipient user's homepage completely. According to one or more implementations in further regards, the capability to generate, store and sort ratings of the catalogs of user activity can be incorporated in database 104, catalog server 110, and/or other associated hardware, software, and logic. The rating system can for instance be stored and managed in catalog server 110 or other resources of the network. In one or more implementations, the rating system and current details of a user's catalog of user activity and associated ratings can be displayed to the user within his or her home page on the Web, on their mobile network, or other sites, services, or locations.

According to one or more implementations in a further regard, the catalog server 110 and associated logic can factor in location-based information in determining catalog information to transmit to a user. In one or more implementations in these regards, the recommendation data transmitted to the user can relate to location-based user data, in addition to or instead of products, content, or services. In one or more implementations in these regards, a user can include an individual as well as a merchant or other commercial entity, such as a retail store or corporation. The location of the subject user can be reported to catalog server 110 via device 102, for instance via the Global Positioning System (GPS) location capability embedded in a cellular telephone. In one or more implementations, when a user approaches or reaches the vicinity or a retail store, for example, the user can be prompted by a notification on device 102 that the retail store can be immediately added as a member of the user's designated group(s), if that merchant user is not already part of the user's designated group(s). If the user has already previously added the retail store or other site or entity to their designated group(s), the user can be prompted to view that merchant user's catalog to access coupons, discounts, or other promotions within the catalog. This notification and option for location-sensitive action allows the user to conveniently expand his or her designated group(s) to include, and be notified about, location-based merchant users or services. A location-based discovery feature can furthermore add geographically-based context and real-time relevance to a recommendation to add a merchant user to a user's designated group(s). In one or more implementations, a location-based discovery capability can also be used to notify individual users of their proximity to other individual users.

Figure 2:
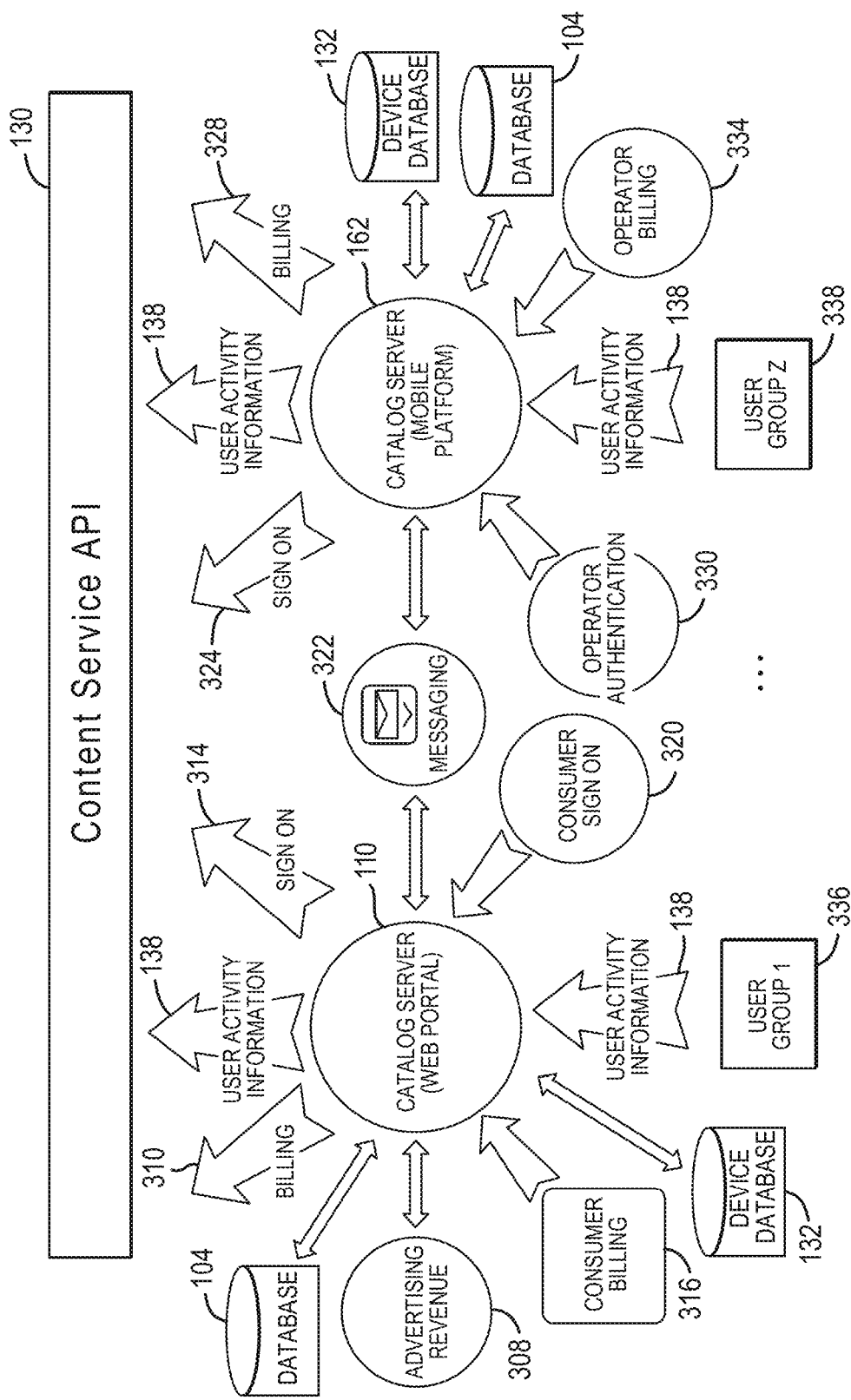
FIG. 2 shows a network diagram of content distribution via a content service application programming interface (API), consistent with one or more aspects of the present teachings.

In terms of the delivery of content streams generated via catalog server 120, and as for instance illustrated in FIG. 2, according to one or more aspects, a request to access database 104 by device 102 and initiate the delivery of content can be made via a content service application programming interface (API) 130. In one or more aspects, content service application programming interface (API) 130 can be hosted in client 108 of device 102, and serve to invoke various resources available in or accessed via catalog server 110, using a predetermined set of function calls and/or other parameters. According to one or more aspects in one regard, because a request to upload transaction data to or receive content streams from catalog server 110 can be abstracted through the interface of content service application programming interface (API) 130, device 102 and its client 108 need not be aware of all details regarding the configuration of user transaction and other data stored in database 104. Device 102 and client 108 can instead merely request delivery of content via catalog server 110 which can access a device database 132 to identify a device type, operator or service identification, and/or operating parameters necessary to communicate with that device.

In one or more aspects as shown, and purely illustratively, inputs, parameters, and data passed to content service application programming interface (API) 130 can include, for instance, advertising revenue data 308, billing data 310, user information activity 138, sign on data 314, consumer billing data 316, sign on data 320 (shown being exchanged by or via a Web portal as catalog server 110 having an associated user group 336, labeled user group 1), etc. In one or more aspects as shown, and also purely illustratively, inputs, parameters, and data passed to content service application programming interface (API) 130 can likewise include sign on data 324, billing data 328, operator billing data 334, and operator authentication data 330 (shown being exchanged by or via a base station or other mobile platform, as catalog server 162, having an associated user group 338, labeled as user group Z), etc. In one or more aspects, catalog server 110 and catalog server 162 can each communicate with resources including, for instance, and associated database 104 and device database 132, and/or other resources. In one or more aspects, two or more catalog servers 110 and 162 can also exchange message data 322 related to catalog activity, between themselves In one or more aspects, content service application programming interface (API) 130 can include, define, or operate on other inputs, parameters, and data.

Figure 3:
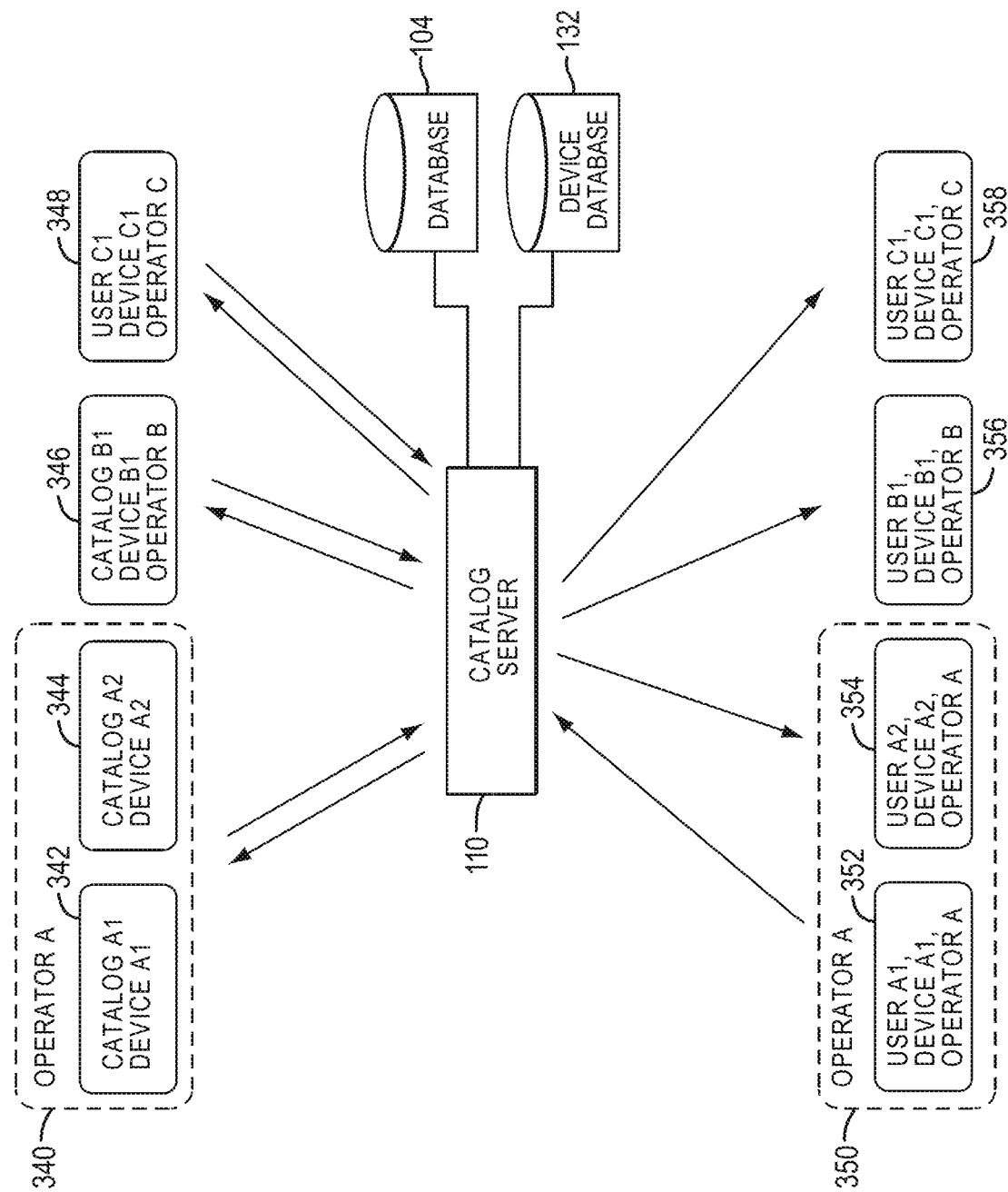
FIG. 3 show a network diagram of content distribution via a catalog server including device-specific translation, consistent with one or more aspects of the present teachings.

According to one or more aspects, and as shown for instance in FIG. 3, the abstraction of content feeds via a content service application programming interface (API) 130 can permit the cross-platform translation and operator, device and platform-independent delivery of content streams to a set of diverse devices, for instance, devices made by different manufacturers, supported by different carries, services or operators, devices having different display resolutions, different connection bandwidths, and/or other operating parameters. As shown in FIG. 3, in one or more aspects and purely illustratively, a given service operator 340 (labeled Operator A), can maintain a group of users and associated device types stored in device database 132. When a first user (illustratively, user A1) uploads transaction data or requests content from a first device 352 (illustratively, device A1) related to a first item (illustratively, item A1), the message can be communicated via catalog server 110 using an associated uniform resource locator (URL, illustratively, URL A1) to a first catalog 342 (illustratively, catalog A1) associated with that user, device, and catalog. When a second user (shown as user A2) for instance wishes to view or receive data captured by or associated with the first user (user A1), or otherwise communicate with the first user or other user, the second user can receive data related to a second item (shown as item A2) associated with a second catalog 344 (shown as catalog A2) and delivered to a second device 354 (shown as device A2) via a second URL (shown as URL A2). In one or more aspects, the first item (item A1) can be recognized as the same as the second item (item A2), when an exact match between records in the different catalogs of a given service or operator can be made. In a further aspect as shown, other exchanges of data or feeds can be made between users (e.g., user B1 having device 356 and user C1 having device 358) and separate catalogs (e.g., catalog 346 (shown as catalog B1) and catalog 348 (shown as catalog C1) supported by different operators, as long as comparative matches or translations between diverse items, catalogs, search engines, database repositories, or other resources related to capturing and organizing user-generated catalog data can be performed or identified.

Figure 4A:
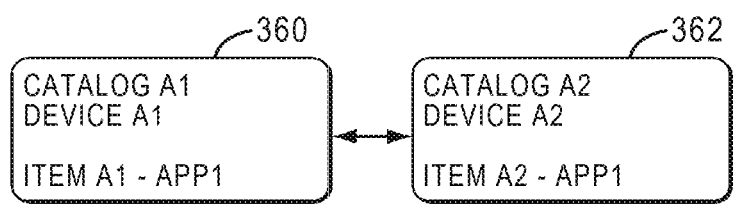
FIGS. 4A-4C show a network diagram of content translation including device-specific translation, translation across search engines, and translation across database repositories, consistent with one or more aspects of the present teachings.
Figure 4B:
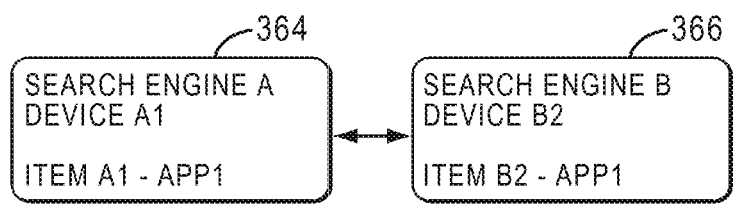

More particularly, and as for instance illustratively shown in FIG. 4A, in one aspect, a catalog server 110 within a given operator having multiple user catalogs can perform an item title keyword match between entries in device-specific catalogs, illustratively shown as catalog 360 (labeled catalog A1) and catalog 362 (labeled catalog A2), stored in database 104 or other data store. Thus, for instance, a user seeking recent transactions containing a keyword term "Racing Game" can receive multiple results from multiple catalogs including various other users and transactions, within or outside their group, which relate to the purchase or rating of that class of product. Similarly, and as for instance shown in FIG. 4B, across multiple operators an item title keyword match can be performed across different operator search engines, illustratively shown as search engine 364 (labeled search engine A) and search engine 366 (labeled search engine B), and hosted, for instance, in the catalog server for two or more operators or service providers. Thus the catalog server can execute a search against respective catalogs for the keyword term "golf clubs," and obtain matching results inside or outside the registered membership group of two or more users.

Figure 4C:
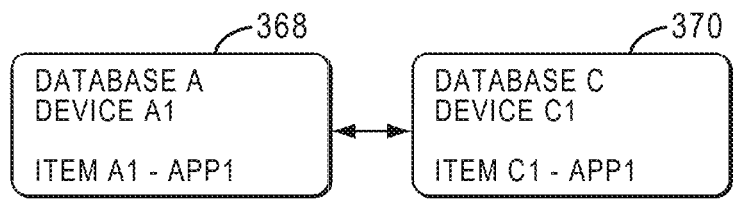

In one or more further aspects, and as for instance shown in FIG. 4C, an item title keyword match can be performed across operator database repositories for two or more operators or service providers, shown as database 368 (labeled database A) and database 372 (shown as database C), to locate matches in repository records for matching keyword terms in catalogs, transaction stores, and/or other data files. Due in certain aspects to the ability to access the user transaction and related data histories across carriers, services, providers and/or operators as well as the ability to adjust content to device-specific requirements, according to platforms and techniques of the present teachings, the user activity records of diverse users operating diverse devices can be universally and mutually accessed, without a need for users to manually reconfigure for different operators or device types. The accessing of user activity feeds via content service application programming interface (API) 130 can therefore be transparently performed as a ubiquitous service, rather than a proprietary resource available only within defined operator networks and/or specific device types.

Figure 5A:
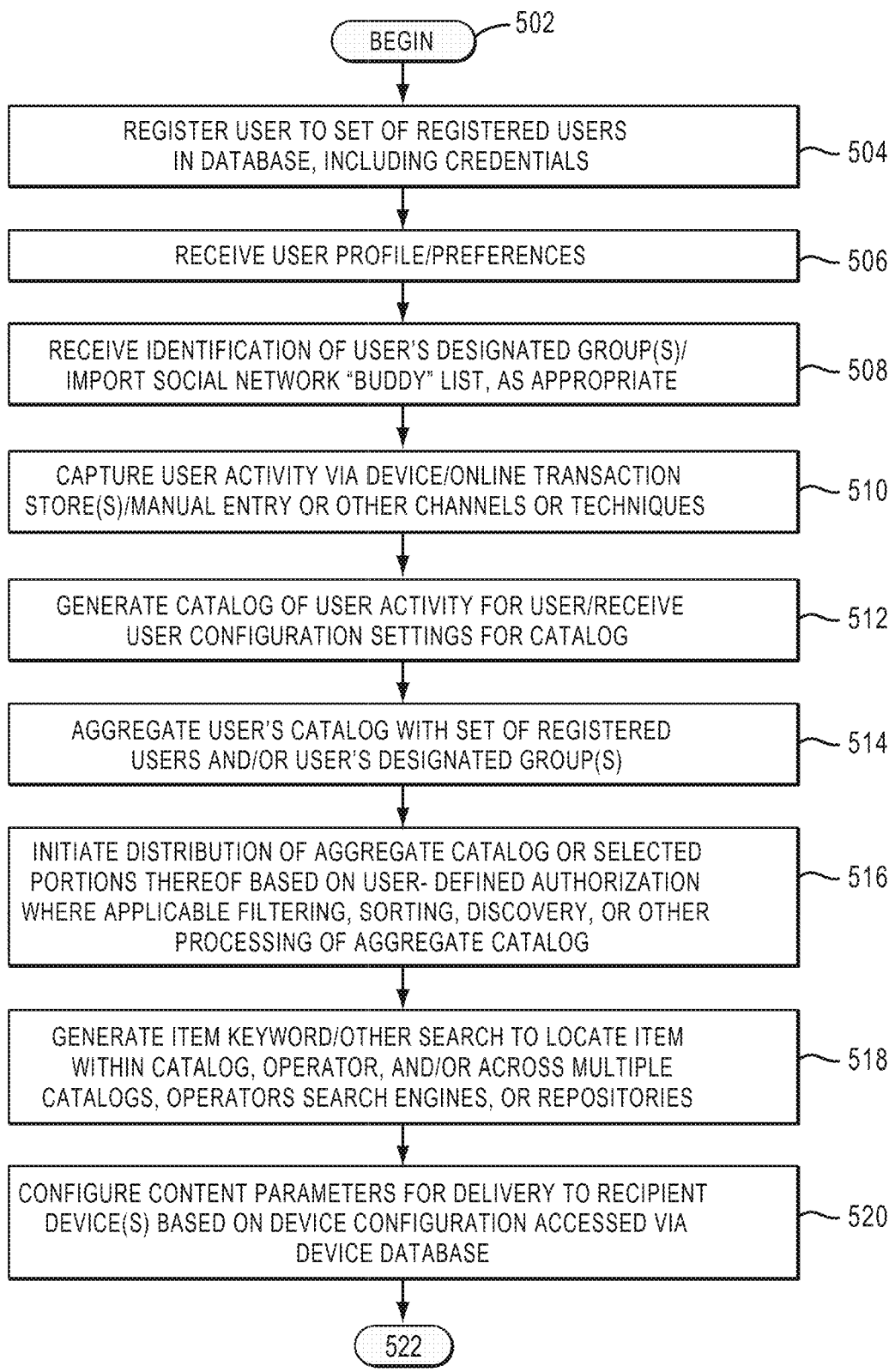
FIGS. 5A-5B illustrate a flowchart of user activity aggregation and distribution including processing activity associated with a catalog server, consistent with one or more aspects of the present teachings.
Figure 5B:
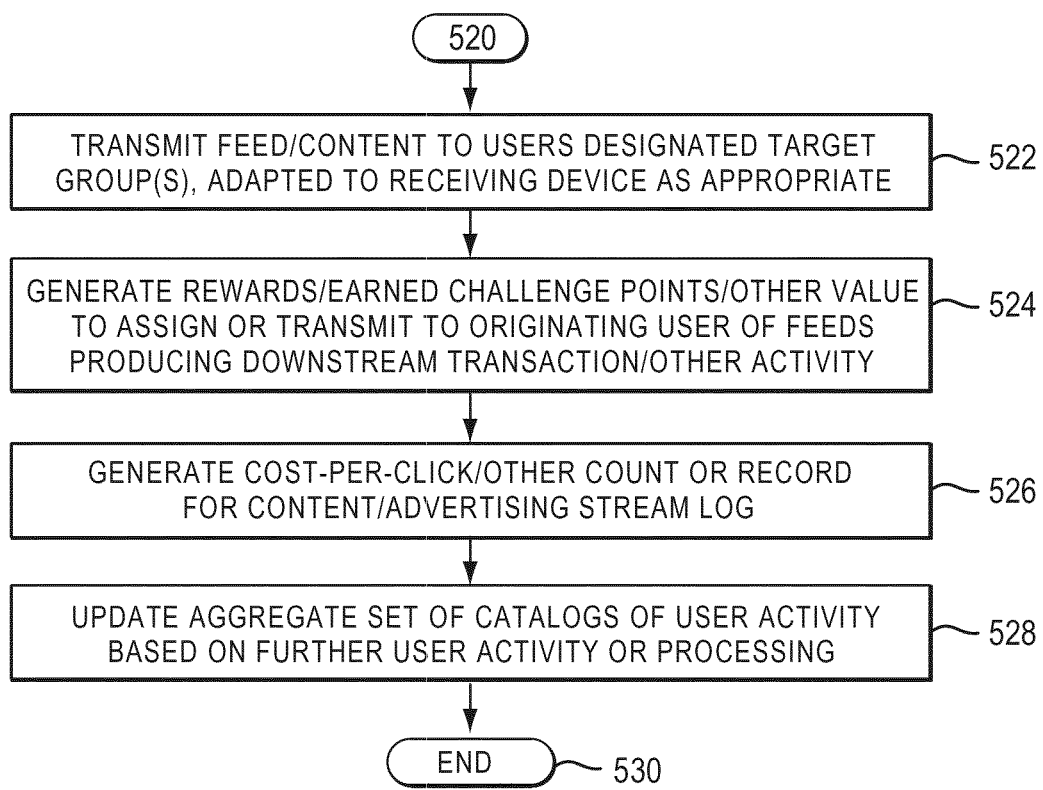

FIGS. 5A and 5B illustrate a flowchart of overall user activity capture and catalog generation and distribution including processing activity associated with catalog server 110, according to one or more implementations of the present teachings. In 502, processing can begin. In 504, a user can be registered to an overall set of registered users to a shared catalog service, for example by receiving and validating user credentials in database 104 to operate or participate in a shared catalog environment 100. In 506, the user's preferences and/or profile settings or other configuration data can be received, for example by prompting the user to indicate those settings or importing those settings from another source. In 508, an identification of the user's designated group or groups can be received, for instance via database 104. In one or more implementations, part or all of the user's designated group(s) can be merged or imported from another source, such as a social networking service or site.

In 510, user activity for the user can be captured via device 102, from data stores associated with online transaction sites, via manual entry by the user or others, or through other channels, networks, or modes. For instance, if device 102 is a cellular telephone, transactions conducted via mobile Web or other applications can be captured and transmitted to catalog server 110, database 104, or other destination. For further instance, in one or more implementations, a retail store or other point of sale site can sort transactions on a daily or other basis, and transmit records of transactions for users registered to the catalog sharing service of the present teachings to catalog server 110, database 104, or other destination. Activity data can be captured using other modes, channels, or techniques. In 512, a catalog of user activity for the subject user can be generated, for instance as an entry in database 104. In one or more implementations, user configuration settings for the user's catalog can likewise be received, for instance to set levels of access to be permitted to different aspects of that user's catalog or other data.

In 514, the user's catalog can be aggregated with the catalogs of the user's designated group(s), and/or with the entire population of the set of registered users, as desired. In 516, a distribution of the aggregate catalog or desired portions or components of the aggregate catalog can be initiated, for instance based on user-defined authorization, where appropriate, and the filtering, sorting discovery, or other processing of the aggregate catalog. A user can for example configure his or her personal catalog to be distributed as a whole to their designated group(s), which distribution catalog server 110 can automatically generate. In one or more aspects, distributions or feeds of user activity can for instance be generated at predetermined times such as fixed intervals, at event-triggered times such as when a participating user conducts or records a transaction, or at other times or based on other conditions. In 518, an item keyword search can be generated to locate an item within a given catalog of a given operator, and/or across multiple catalogs, search engines, or repositories of different operators to locate items or activity of interest to a user or their group, as appropriate. In 520, content parameters for delivery to a recipient device or devices can be configured by accessing device database 132, for instance to identify a video resolution for the recipient display screen. In 522, the generated distribution or feed of user activity can be transmitted to the subject user's designated group(s) or other targets, with configuration settings adapted to the receiving device, as appropriate.

In 524, rewards, earned challenge points, loyalty points, or other value can be generated to assign or transmit to an originating user of feeds or content that produce downstream transaction or other activity, as appropriate. For example, catalog server 110 can communicate with set of loyalty programs 114 to determine rewards points or other value associated with downstream purchases initiated by or associated with a user's feeds or other distributed content. In 526, the cost-per-click or other count or record for feeds, associated links, or other content can be generated for a content/advertising stream log. In one or more implementations, the content/advertising stream log of clicks or other activity can be generated via catalog server 110 and be used to remunerate a carrier, content provider, or other operator or entity participating in shared-catalog environment 100.

In 528, the aggregate set of catalogs of user activity can be updated to reflect further user activity by one or more users, newly processed data or content received in database 104, or other updates or revisions, as appropriate. In 530, processing can repeat, return to a prior processing point, jump to a further processing point, or end.

Figure 6:
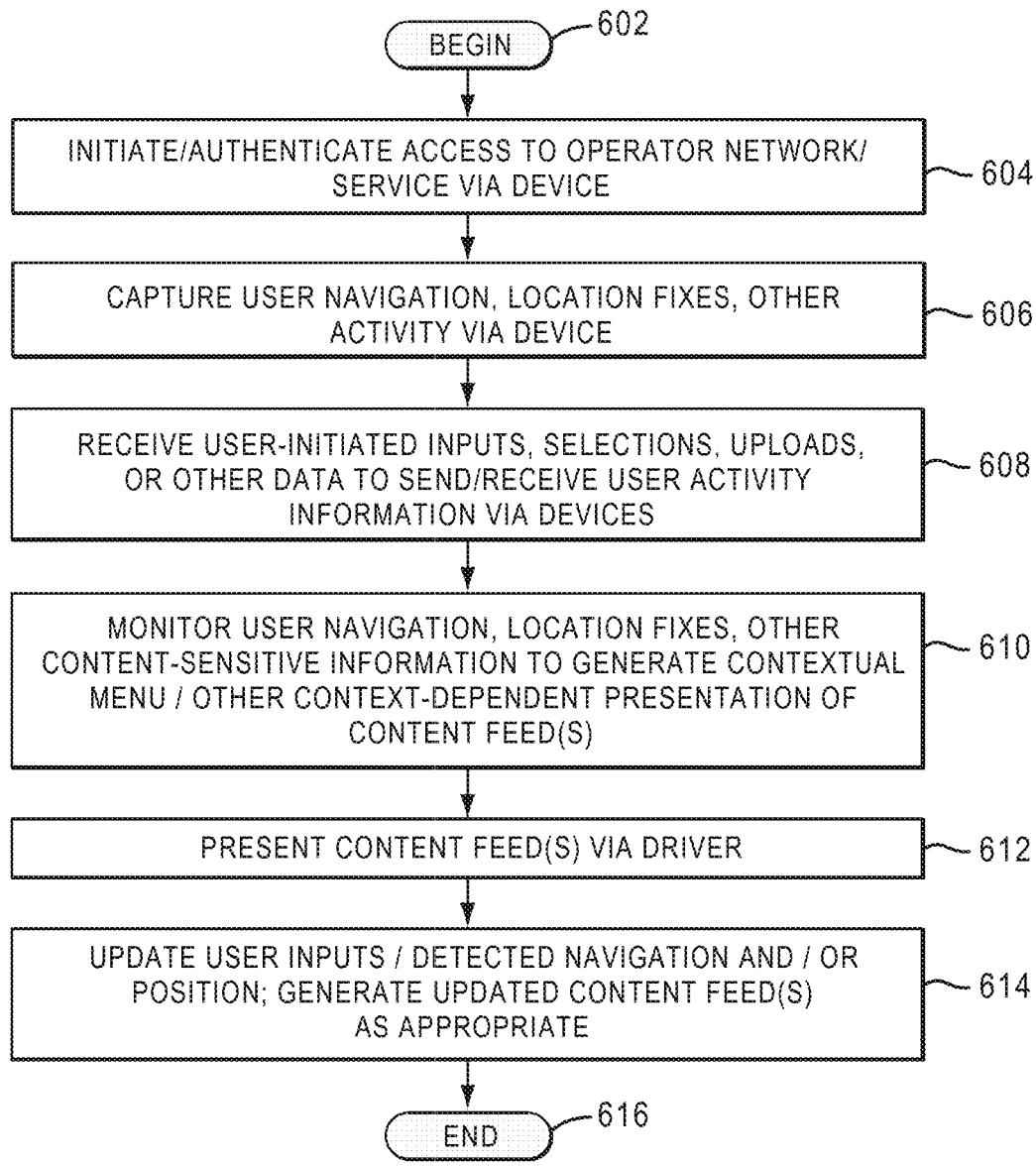
FIG. 6 illustrates a flowchart of user activity aggregation and distribution including processing activity associated with a device, consistent with one or more aspects of the present teachings.

FIG. 6 illustrates a flowchart of overall user activity capture and catalog generation and distribution including processing activity associated with device 102, according to one or more implementations of the present teachings. In 602, processing can begin. In 604, access to an operator, network, or service can be initiated and/or authenticated via device 102, for instance by a user powering up a mobile device or logging into a Web site using a personal computer. In 606, user navigation data, such as uniform resource locators (URLs), user location fixes such as global positioning system (GPS) fixes, and/or other user activity can be captured via device 102. In 608, user-initiated inputs, selections, uploads or other data can be received in or via device 102 to send/receive user activity information 138. For instance, a user can operate a mobile device keypad to select a user feed on a drop-down or other menu. In 610, user navigation, location fix, and/or other context-sensitive information can be monitored to generate a context-sensitive menu 136 or other context-dependent presentation of content feed(s) and related information. In 612, the accessed content feed(s) can be presented via device 102, for instance via a graphical user interface presented on device 102. In 614, user inputs, detected user navigation activity, and/or detected user location fixes can be updated, and updated content feed(s) resulting from new user navigation and/or position information can be generated, as appropriate. In 616, processing can repeat, return to a prior processing point, jump to a further processing point, or end.

Figure 7:
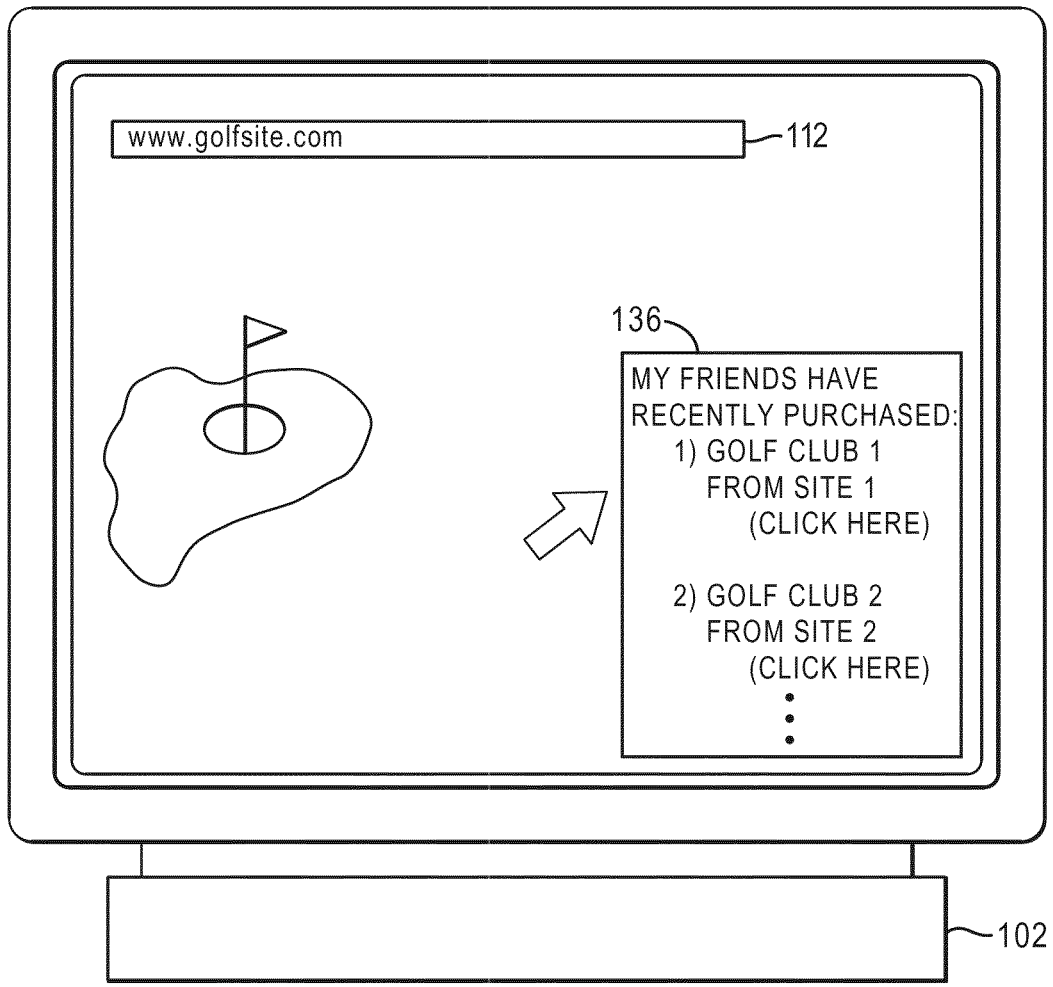
FIG. 7 illustrates an exemplary interface displaying context-sensitive delivery of user-experience content feeds, consistent with one or more aspects of the present teachings.

According to one or more implementations in further regards, in terms of activity feeds, and as for example illustrated in aspects in FIG. 7, a set of Web sites 112 or other sources can be configured to generate and present context-sensitive menu 136 or other lists or menus of available catalogs of user activity and/or related user feeds, based on registration of the set of Web sites 112 to database 104 via catalog server 110. The user's presence or navigation at a content-enabled or context-sensitive Web site via device 102 can be detected, for example, by detecting a uniform resource locator (URL) registered to or associated with shared catalog environment 100. The user navigating to a site within the set of Web sites 112 can be required to enable catalog sharing once the user has navigated to or accessed that site. The activation of catalog sharing on a participating site can require the user to identify who they are, for example, using their catalog-sharing credentials. Upon activation and identification of the user, the user can receive the set of catalogs of user activity for their designated group(s) related to that Web site in context-sensitive fashion. For instance, a user can be presented with context-sensitive menu 136 of the purchases of golf clubs or other sporting equipment from a sports merchant site made by members of their designated group(s).

The context-sensitive menu 136 or other presentation object or widget can give the user the option of exploring details of that activity of those members of their designated group(s), and/or the option of directly purchasing the same item. In one or more implementations employing Web site-sensing in this manner, device 102 can be configured with client-side application programming interfaces (APIs) interacting with client 108 or other resources to detect and activate user feeds and other options on the Web site. Corresponding server-side APIs to permit access to database 104 and distribution of feeds from catalog server 110 to device 102 can also be used. In one or more implementations, upon receiving a context-sensitive feed or other content at a site within set of Web sites 112, if the user clicks or selects a recommendation by a member of his or her designated group(s), the user can be re-directed to the link associated with the recommendation, such as a checkout page. In one or more implementations, the creators or operators of sites within the set of Web sites 112 can be allocated a revenue share based on their hosting of the feeds on their site, for example based on a cost per click (CPC), cost per mille (or thousand) impressions (CPM), or other basis. In one or more implementations, the user feed or feeds showing recommendations, ratings, or other activity from other users can be presented in a banner ad on the participating Web site, or in other locations, formats, or media. In one or more implementations, a user-generated feed can be treated as an advertisement, and be tracked on a cost-per-click basis for purposes of compensation or rewards to the originating user or others.

Figure 8:
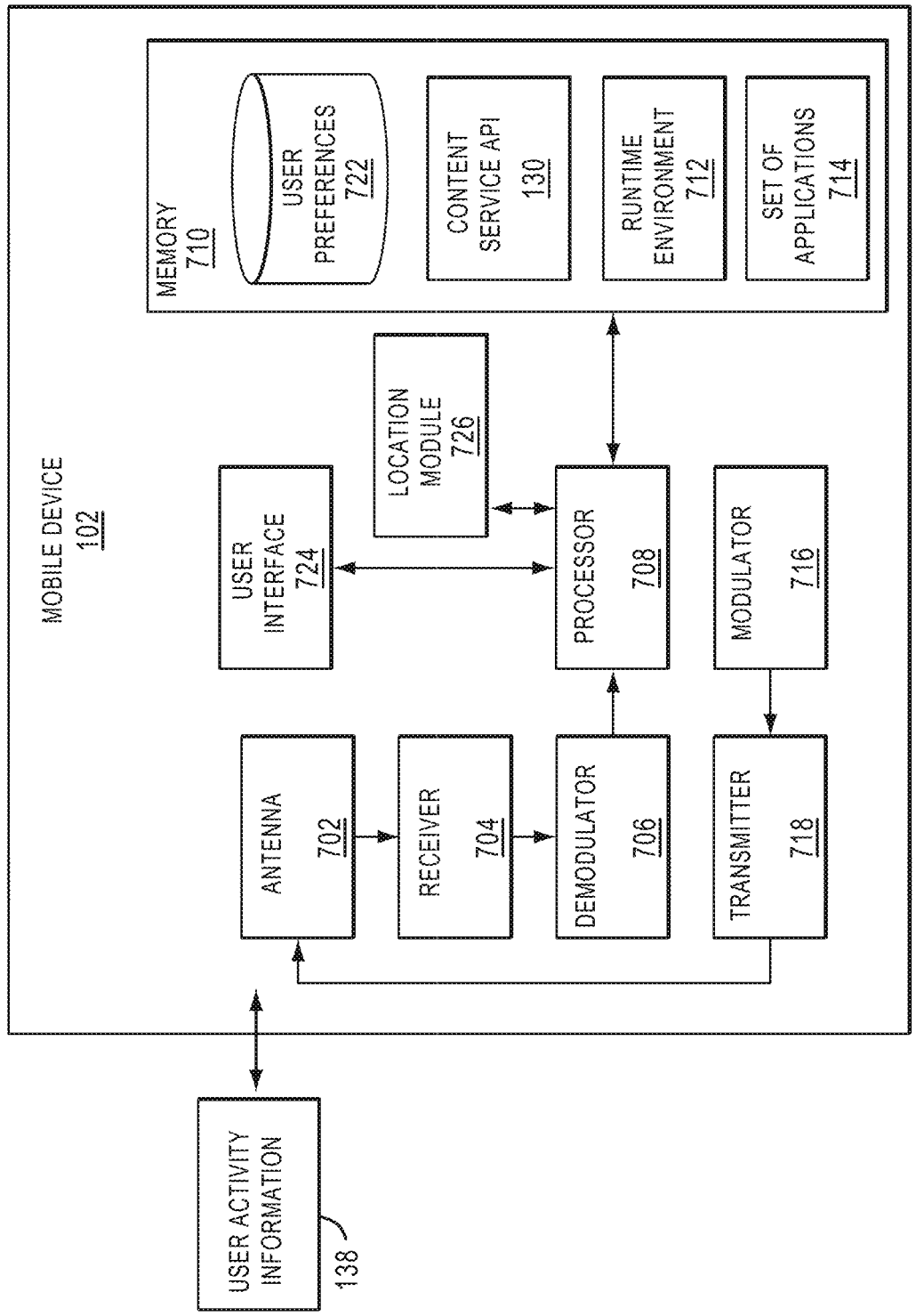
FIG. 8 illustrates an exemplary set of hardware and other resources in a mobile device, according to one or more implementations of the present teachings.

FIG. 8 illustrates an exemplary configuration of hardware, software, and other resources of a mobile device 102, consistent with one or more implementations of the present teachings. Mobile device 102 can include at least one antenna 702 (e.g., a transmission receiver or group of such receivers comprising an input interface, etc.) that receives a signal (e.g., pertaining to a mobile call initiation or other handshake, a handshake response, a mobile application data transfer, a data event, data event response, handshake termination, and so on) and a receiver 704, which performs actions (e.g., filters, amplifies, down-converts, etc.) on the received signal. Antenna 702 can be further coupled to a transmitter 718 to transmit signals. Antenna 702 can for example transmit or receive a response to a handshake request, data event request, or the like. Transmitted signals can be or include a set of user activity information 138, and other data, as described herein. Antenna 702 and receiver 704 can also be coupled with a demodulator 706 that can demodulate received signals and provide the demodulated information to a processor 708 for processing. Mobile device 102 can additionally include memory 710 that is coupled to processor 708 and that can store data to be transmitted, received, and the like.

Processor 708 can analyze user activity information 138 received by antenna 702 and/or a user interface 724 of the mobile device 102 and/or generate user activity information 138 or other data for transmission by a transmitter 718 via a modulator 716. Additionally, processor 708 can control and/or access one or more resources or components (e.g., 706, 712, 714, 716, 718, etc.) of the mobile device 102. Processor 708 can execute a runtime environment 712, such as BREW® runtime environment available from QUALCOMM Incorporated, as well as one or more set of applications 714 or other software, modules, applications, logic, code, or the like. In one or more aspects, set of applications 714 can include client 108 and/or other applications or resources. Processor 708 can in one or more implementations communicate with a location module 726, such as a Global Positioning System (GPS) module or chip, to receive and process location-related information, including location fixes for the user. Processor 708 can further communicate with a content service application programming interface (API) 130 to invoke catalog processing functions to execute function calls to extract user activity information 138 and perform other actions, according to the present teachings. Processor 708 can likewise couple with user interface 724, such as a graphical user interface or other graphical display, to display graphics, video, call-related data, user activity feeds as described herein, and other information.

FIG. 9 illustrates an exemplary set of hardware, software, and other resources that can be incorporated in, maintained by, or associated with catalog server 110 that can communicate content streams and other data to and from one or more device 102, and associated network components, according to various implementations. Catalog server 110 can include, access, or communicate with a receiver 810 that receives signal(s) from one or more devices 102 through a plurality of receive antennas 806, and a transmitter 822 that transmits or communicates to the one or more device 102, for instance through a transmit antenna 808, for instance to transmit context-sensitive menu 138 or other catalog-related data. Receiver 810 can receive information from receive antennas 806 and be operatively coupled with a demodulator 812 that demodulates received information, including for instance user activity information 138. A processor 814 can analyze demodulated signals provided by demodulator 812. The processor 814 further couples to a memory 816 that can store one or more application 818 that can execute, support, facilitate and/or participate in user catalog activities as described herein. Processor 814 can likewise communicate with a catalog manager module 826 to process user activity information 138 and other data to generate and distribute user activity catalog information, as described herein. Processor 814 can in addition communicate with a network interface 822, such as an Ethernet or other wired, optical, or wireless interface, to communicate with other network links or resources, such as database 104 and device database 132. In one or more implementations, resources such as processor 814 and others can be hosted in catalog server 110, or can in aspects be hosted in base station 140, and/or in other server, wireless server, or other resources. In one or more implementations processing, storages, and other resources can be distributed and/or located separately or remotely from catalog server 110.

The foregoing description is illustrative, and variations in configuration and implementation may occur to persons skilled in the art. For instance, the various illustrative logics, logical blocks, modules, devices, and circuits, including personal computers, cellular telephones, media playback devices, and servers, described in connection with the implementations disclosed herein may be implemented or performed with or using a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. In one or more exemplary implementations, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. The steps of a method or algorithm described in connection with the implementations disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium is coupled to the processor, such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95, and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE, and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

For further example, while implementations have been described in which the set of catalogs of user activity is stored to a single database 104, in one or more implementations catalogs of user activity and other data can be stored to multiple data stores. Other resources described as singular or integrated can in one or more implementations be plural or distributed, and resources described as multiple or distributed can in one or more implementations be combined. The scope of the present teachings is accordingly intended to be limited only by the following claims.

What is claimed is:

1. A method of generating content feeds from a shared database of user activity, comprising:
    capturing a user-specific catalog of user activity information for each user in a set of users, wherein each user-specific catalog of user activity information includes commercial information that characterizes services and/or products that have been transacted by a user associated with the user-specific catalog or services and/or products that are of interest to the user;
    aggregating user-specific catalogs of user activity information for the set of users in a database;
    selectively extracting, from the aggregated user-specific catalogs based on a designation of a product or service description from a first user and a context of a user device of the first user, user activity information that matches the product or service description from the commercial information of one or more user-specific catalogs of one or more other users that belong to at least one group of users in the set of users, wherein the selectively extracting comprises providing a context-dependent selectable menu of the user-specific catalogs within the aggregated user-specific catalogs activated by navigation to a site associated with a user-specific catalog of user activity information of the first user;
    translating the selectively extracted user activity information into a plurality of product or service recommendations for delivery to the first user;
    filtering the plurality of product or service recommendations based on a location of the first user; and
    distributing a content feed representing at least a portion of the user-specific catalog of user activity information of the first user to other users in the set of users based on preferences of the first user.

2. The method of claim 1, wherein the translating is based on at least one of service operator data for the first user, the user device and client platform data for the first user, or device configuration data for the first user.

3. The method of claim 1, wherein the first user is at least one of a mobile device user, a network-enabled media playback device user, or a personal computer user operating the personal computer to navigate the Internet.

4. The method of claim 1, wherein the user activity information captured within the user-specific catalogs comprises at least one of transaction activity, user service experience information, user content consumption information, user location information, user recommendation information, or other user activity information.

5. The method of claim 1, wherein the user activity information captured within the user-specific catalogs is captured automatically in at least substantially real-time via at least one of a personal computing device operated to navigate the Internet, a network-enabled media playback and transmission device, or a mobile cellular device.

6. The method of claim 1, wherein aggregating the user-specific catalogs of user activity information comprises sorting the user-specific catalogs for the set of users based on at least one of location information, frequency of activity information, transaction information, time and date information, social network designation information, recommendation rating information, or other user attributes defined in a shared catalog environment.

7. The method of claim 1, wherein the commercial information for at least one user in the set of users characterizes services and/or products that have been purchased, licensed or rented by the at least one user.

8. The method of claim 1, wherein the commercial information for at least one user in the set of users characterizes services and/or products that are of interest to the at least one user.

9. The method of claim 1, further comprising:
    determining that the first user purchases at least one product or service based on the plurality product or service recommendations; and
    issuing, in response to the determination, a reward to a given user associated with a given user-specific catalog from which the selectively extracted user activity information was extracted.

10. The method of claim 1, wherein the designation by the first user corresponds to a user-initiated keyword search within the aggregated user-specific catalogs for information associated with at least one product or service, wherein the product or service description corresponds to one or more keywords that are part of the user-initiated keyword search.

11. A system for generating content feeds from a shared database of user activity, comprising:
    a communications interface to a set of users; and
    a processor, communicating with the set of users via the communications interface, the processor being configured to:
        capture a user-specific catalog of user activity information for each user of users, wherein each user-specific catalog of user activity information includes commercial information that characterizes services and/or products that have been transacted by a user associated with the user-specific catalog or services and/or products that are of interest to the user;

aggregate user-specific catalogs of user activity information for the set of users in a database;
selectively extract, from the aggregated user-specific catalogs based on a designation of a product or service description from a first user and a context of a user device of the first user, user activity information that matches the product or service description from the commercial information of one or more user-specific catalogs of one or more other users that belong to at least one group of users in the set of users, wherein the processor being configured to selectively extract comprises the processor being configured to provide a context-dependent selectable menu of the user-specific catalogs within the aggregated user-specific catalogs activated by navigation to a site associated with a user-specific catalog of user activity information of the first user;
translate the selectively extracted user activity information into a plurality of product or service recommendations for delivery to the first user;
filter the plurality of product or service recommendations based on a location of the first user; and
distribute a content feed representing at least a portion of the user-specific catalog of user activity information of the first user to other users in the set of users based on preferences of the first user.

12. The system of claim 11, wherein the translation is based on at least one of service operator data for the first user, the user device and client platform data for the first user, or device configuration data for the first user.

13. The system of claim 11, wherein the first user is at least one of a mobile device user, a network-enabled media playback device user, or a personal computer user operating the personal computer to navigate the Internet.

14. The system of claim 11, wherein the user activity information captured within the user-specific catalogs comprises at least one of transaction activity, user service experience information, user content consumption information, user location information, or user recommendation information.

15. The system of claim 11, wherein the user activity information captured within the user-specific catalogs is captured automatically in at least substantially real-time via at least one of a personal computing device operated to navigate the Internet, a network-enabled media playback device, or a mobile cellular device.

16. The system of claim 11, wherein the processor being configured to aggregate the user-specific catalogs of user activity information comprises the processor being configured to sort the user-specific catalogs for the set of users based on at least one of location information, frequency of activity information, transaction information, time and date information, social network designation information, or recommendation rating information.

17. A system for generating content feeds from a shared database of user activity, comprising:
means for interfacing to a set of users; and
means for processing data, communicating with the set of users via the means for interfacing, the means for processing data being configured to:
capture a user-specific catalog of user activity information for each user in the set of users, wherein each user-specific catalog of user activity information includes commercial information that characterizes services and/or products that have been transacted by a user associated with the user-specific catalog or services and/or products that are of interest to the user;
aggregate user-specific catalogs of user activity information for the set of users in a database;
selectively extract, from the aggregated user-specific catalogs based on a designation of a product or service description from a first user and a context of a user device of the first user, user activity information that matches the product or service description from the commercial information of one or more user-specific catalogs of one or more other users that belong to at least one group of users in the set of users, wherein the means for processing data being configured to selectively extract comprises the means for processing data being configured to provide a context-dependent selectable menu of the user-specific catalogs within the aggregated user-specific catalogs activated by navigation to a site associated with a user-specific catalog of user activity information of the first user;
translate the selectively extracted user activity information into a plurality of product or service recommendations for delivery to the first user;
filter the plurality of product or service recommendations based on a location of the first user; and
distribute a content feed representing at least a portion of the user-specific catalog of user activity information of the first user to other users in the set of users based on preferences of the first user.

18. The system of claim 17, wherein the translation is based on at least one of service operator data for the first user, the user device and client platform data for the first user, or device configuration data for the first user.

19. The system of claim 17, wherein the first user is at least one of a mobile device user, a network-enabled media playback device user, or a personal computer user operating the personal computer to navigate the Internet.

20. The system of claim 17, wherein the user activity information captured within the user-specific catalogs comprises at least one of transaction activity, user service experience information, user content consumption information, user location information, or user recommendation information.

21. The system of claim 17, wherein the user activity information captured within the user-specific catalogs is captured automatically in at least substantially real-time via at least one of a personal computing device operated to navigate the Internet, a network-enabled media playback device, or a mobile cellular device.

22. The system of claim 17, wherein the means for processing data being configured to aggregate the user-specific catalogs of user activity information comprises the means for processing data being configured to sort the user-specific catalogs for the set of users based on at least one of location information, frequency of activity information, transaction information, time and date information, social network designation information, or recommendation rating information.

23. A non-transitory computer-readable medium comprising:
at least one instruction for causing a computer to capture a user-specific catalog of user activity information for each user in a set of users, wherein each user-specific catalog of user activity information includes commercial information that characterizes services and/or products that have been transacted by a user associated with the user-specific catalog or services and/or products that are of interest to the user;
at least one instruction for causing the computer to aggregate user-specific catalogs of user activity information for the set of users in a database;

at least one instruction for causing the computer to selectively extract, from the aggregated user-specific catalogs based on a designation of a product or service description from a first user and a context of a user device of the first user, user activity information that matches the product or service description from the commercial information of one or more user-specific catalogs of one or more other users that belong to at least one group of users in the set of users, wherein the at least one instruction for causing the computer to selectively extract comprises at least one instruction for causing the computer to provide a context-dependent selectable menu of the user-specific catalogs within the aggregated user-specific catalogs activated by navigation to a site associated with a user-specific catalog of user activity information of the first user;

at least one instruction for causing the computer to translate the selectively extracted user activity information into a plurality of product or service recommendations for delivery to the first user;

at least one instruction for causing the computer to filter the plurality of product or service recommendations based on a location of the first user; and at least one instruction for causing the computer to distribute a content feed representing at least a portion of the user-specific catalog of user activity information of the first user to other users in the set of users based on preferences of the first user.

24. The non-transitory computer-readable medium of claim 23, wherein the at least one instruction for causing the computer to translate comprises at least one instruction for causing the computer to translate the selectively extracted user activity information for delivery to the first user based on at least one of service operator data for the first user, the user device and client platform data for the first user, or device configuration data for the first user.

25. The non-transitory computer-readable medium of claim 23, wherein the first user is at least one of a mobile device user, a network-enabled media playback device user, or a personal computer user operating the personal computer to navigate the Internet.

26. The non-transitory computer-readable medium of claim 23, wherein the user activity information captured within the user-specific catalogs comprises at least one of transaction activity, user service experience information, user content consumption information, user location information, or user recommendation information.

27. The non-transitory computer-readable medium of claim 23, wherein the user activity information captured within the user-specific catalogs is captured automatically in at least substantially real-time via at least one of a personal computing device operated to navigate the Internet, a network-enabled media playback device, or a mobile cellular device.

28. The non-transitory computer-readable medium of claim 23, wherein the at least one instruction for causing the computer to aggregate the user-specific catalogs of user activity information comprises at least one instruction for causing the computer to sort the user-specific catalogs for the set of users based on at least one of location information, frequency of activity information, transaction information, time and date information, social network designation information, or recommendation rating information.

29. A method of receiving content feeds from a shared database of user activity in a device, comprising:

capturing a user-specific catalog of user activity information for a first user of the device;

communicating the user-specific catalog of user activity information for the first user of the device to a database for aggregation with a set of user-specific catalogs of user activity information for a set of users in the database, wherein each user-specific catalog in the set of user-specific catalogs of user activity information includes commercial information that characterizes services and/or products that have been transacted by a user associated with the user-specific catalog or services and/or products that are of interest to the user;

initiating, based on a designation of a product or service description from the first user and a context of the device, selective access by the first user to a product or service recommendation that is based upon user activity information that matches the product or service description from the commercial information within a set of user-specific catalogs of one or more user-specific catalogs of one or more other users that belong to at least one group of users in the set of users and that is filtered based on a location of the first user;

accessing a context-dependent selectable menu of the user-specific catalogs within the aggregated user-specific catalogs by navigating to a site associated with a user-specific catalog of user activity information for another user of the set of users; and receiving a content feed representing at least a portion of a user-specific catalog of user activity information of another user of the set of users based on preferences of the other user.

30. The method of claim 29, wherein the product or service recommendation is based on at least one of service operator data for the first user, device and client platform data for the first user, or device configuration data for the first user.

31. The method of claim 29, wherein the first user is at least one of a mobile device user, a network-enabled media playback device user, or a personal computer user operating the personal computer to navigate the Internet.

32. The method of claim 29, wherein the user activity information within the set of user-specific catalogs comprises at least one of transaction activity, user service experience information, user content consumption information, user location information, or user recommendation information.

33. The method of claim 29, wherein capturing the user activity information comprises capturing the user activity information automatically in at least substantially real-time via at least one of a personal computing device operated to navigate the Internet, a network-enabled media playback device, or a mobile cellular device.

34. The method of claim 29, wherein the selective access comprises at least one of performing a keyword search match across a set of content providers, platform providers, search providers, database repositories or other data warehouses, or adjusting a content stream associated with the commercial information based on device configuration parameters and user attributes.

35. A device, comprising:
a communications interface to a database; and
a processor, communicating with the database via the communications interface, the processor being configured to:
capture a user-specific catalog of user activity information for a first user of the device;
communicate the user-specific catalog of user activity information for the first user of the device to the database for aggregation with a set of user-specific catalogs of user activity information for a set of users in the database, wherein each user-specific catalog in the set of user-specific catalogs of user activity information includes commercial information that characterizes services and/or products that have been transacted by a user associated with the user-specific catalog or services and/or products that are of interest to the user;

initiate, based on a designation of a product or service description from the first user and a context of the device, selective access by the first user to a product or service recommendation that is based upon user activity information that matches the product or service description from the commercial information within a set of user-specific catalogs of one or more user-specific catalogs of one or more other users that belong to at least one group of users in the set of users and that is filtered based on a location of the first user;

access a context-dependent selectable menu of the user-specific catalogs within the aggregated user-specific catalogs by navigating to a site associated with a user-specific catalog of user activity information for another user of the set of users; and receive a content feed representing at least a portion of a user-specific catalog of user activity information of another user of the set of users based on preferences of the other user.

36. The device of claim 35, wherein the product or service recommendation is based on at least one of service operator data for the first user, device and client platform data for the first user, or device configuration data for the first user.

37. The device of claim 35, wherein the first user is at least one of a mobile device user, a network-enabled media playback device user, or a personal computer user operating the personal computer to navigate the Internet.

38. The device of claim 35, wherein the user activity information within the set of user-specific catalogs comprises at least one of transaction activity, user service experience information, user content consumption information, user location information, or user recommendation information.

39. The device of claim 35, wherein the processor being configured to capture the user activity information comprises the processor being configured to capture the user activity information automatically in at least substantially real-time via at least one of a personal computing device operated to navigate the Internet, a network-enabled media playback device, or a mobile cellular device.

40. The device of claim 35, wherein the processor being configured to selectively access comprises the processor being configured to perform a keyword search match across a set of content service providers, or to adjust a content stream associated with the commercial information based on device configuration parameters.

41. A device, comprising:
means for interfacing to a database; and
means for processing data, communicating with the database via the means for interfacing, the means for processing data being configured to:
capture a user-specific catalog of user activity information for a first user of the device;
communicate the user-specific catalog of user activity information for the first user of the device to the database for aggregation with a set of user-specific catalogs of user activity information for a set of users in the database, wherein each user-specific catalog in the set of user-specific catalogs of user activity information includes commercial information that characterizes services and/or products that have been transacted by a user associated with the user-specific catalog or services and/or products that are of interest to the user;

initiate, based on a designation of a product or service description from the first user and a context of the device, selective access by the first user to a product or service recommendation that is based upon user activity information that matches the product or service description from the commercial information within a set of user-specific catalogs of one or more user-specific catalogs of one or more other users that belong to at least one group of users in the set of users and that is filtered based on a location of the first user;

access a context-dependent selectable menu of the user-specific catalogs within the aggregated user-specific catalogs by navigating to a site associated with a user-specific catalog of user activity information for another user of the set of users; and receive a content feed representing at least a portion of a user-specific catalog of user activity information of another user of the set of users based on preferences of the other user.

42. The device of claim 41, wherein the product or service recommendation is based on at least one of service operator data for the first user, device and client platform data for the first user, or device configuration data for the first user.

43. The device of claim 41, wherein the first user is at least one of a mobile device user, a network-enabled media playback device user, or a personal computer user operating the personal computer to navigate the Internet.

44. The device of claim 41, wherein the user activity information within the set of user-specific catalogs comprises at least one of transaction activity, user service experience information, user content consumption information, user location information, or user recommendation information.

45. The device of claim 41, wherein the means for processing data being configured to capture the user activity information comprises the means for processing data being configured to capture the user activity information automatically in at least substantially real-time via at least one of a personal computing device operated to navigate the Internet, a network-enabled media playback device, or a mobile cellular device.

46. The device of claim 41, wherein the means for processing data being configured to selectively access comprises the means for processing data being configured to perform a keyword search match across a set of content service providers, or to adjust a content stream associated with the commercial information based on device configuration parameters.

47. A non-transitory computer-readable medium comprising:
at least one instruction for causing a computer to capture a user-specific catalog of user activity information for a first user of a device;
at least one instruction for causing the computer to communicate the user-specific catalog of user activity information for the first user of the device to a database for aggregation with a set of user-specific catalogs of user activity information for a set of users in the database, wherein each user-specific catalog in the set of user-specific catalogs of user activity information includes commercial information that characterizes services and/or products that have been transacted by a user associated with the user-specific catalog or services and/or products that are of interest to the user;
at least one instruction for causing the computer to initiate, based on a designation of a product or service description from the first user and a context of the device, selective access by the first user to a product or service recommendation that is based upon user activity information that matches the product or service description from the commercial information within a set of user-specific catalogs of one or more user-specific catalogs of one or more other users that belong to at least one group of users in the set of users and that is filtered based on a location of the first user;

at least one instruction for causing the computer to access a context-dependent selectable menu of the user-specific catalogs within the aggregated user-specific catalogs by navigating to a site associated with a user-specific catalog of user activity information for another user of the set of users; and at least one instruction for causing the computer to receive a content feed representing at least a portion of a user-specific catalog of user activity information of another user of the set of users based on preferences of the other user.

48. The non-transitory computer-readable medium of claim 47, wherein the product or service recommendation is based on at least one of service operator data for the first user, device and client platform data for the first user, or device configuration data for the first user.

49. The non-transitory computer-readable medium of claim 47, wherein the first user is at least one of a mobile device user, a network-enabled media playback device user, or a personal computer user operating the personal computer to navigate the Internet.

50. The non-transitory computer-readable medium of claim 47, wherein the user activity information within the set of user-specific catalogs comprises at least one of transaction activity, user service experience information, user content consumption information, user location information, or user recommendation information.

51. The non-transitory computer-readable medium of claim 47, wherein the at least one instruction for causing the computer to automatically capture the user activity information captures the user activity information in at least substantially real-time via at least one of a personal computing device operated to navigate the Internet, a network-enabled media playback device, or a mobile cellular device.

52. The non-transitory computer-readable medium of claim 47, wherein the at least one instruction for causing the computer to selectively access comprises at least one instruction for causing the computer to perform a keyword search match across a set of content service providers, or to adjust a content stream associated with the commercial information based on device configuration parameters.

53. A method of generating context-sensitive content feeds from a shared database of user activity, comprising:

capturing a user-specific catalog of user activity information for each user in a set of users, wherein each user-specific catalog of user activity information includes commercial information that characterizes services and/or products that have been transacted by a user associated with the user-specific catalog or services and/or products that are of interest to the user;

aggregating user-specific catalogs of user activity information for the set of users in a database;

receiving context-dependent information associated with network usage or a location of a first user or other user attribute;

selectively extracting, from the aggregated user-specific catalogs based on the context-dependent information, user activity information that matches a product or service description designated by the first user from the commercial information for one or more user-specific catalogs of one or more other users that belong to at least one group of users in the set of users, wherein the selectively extracting comprises providing a context-dependent selectable menu of the user-specific catalogs within the aggregated user-specific catalogs activated by navigation to a site associated with a user-specific catalog of user activity information of the first user;

translating the selectively extracted user activity information into a plurality of product or service recommendations for delivery to the first user;

filtering the plurality of product or service recommendations based on a location of the first user; and distributing a content feed representing at least a portion of the user-specific catalog of user activity information of the first user to other users in the set of users based on preferences of the first user.

54. The method of claim 53, wherein the user activity information captured within the user-specific catalogs comprises at least one of transaction activity, user service experience information, user content consumption information, user location information, or user recommendation information.

55. A system for generating context-sensitive content feeds from a shared database of user activity, comprising:

a communications interface to a set of users; and a processor, communicating with the set of users via the communications interface, the processor being configured to:

capture a user-specific catalog of user activity information for each user in the set of users, wherein each user-specific catalog of user activity information includes commercial information that characterizes services and/or products that have been transacted by a user associated with the user-specific catalog or services and/or products that are of interest to the user;

aggregate user-specific catalogs of user activity information for the set of users in a database;

receive context-dependent information associated with network usage or a location of a first user;

selectively extract, from the aggregated user-specific catalogs based on the context-dependent information, user activity information that matches a product or service description designated by the first user from the commercial information for one or more user-specific catalogs of one or more other users that belong to at least one group of users in the set of users, wherein the processor being configured to selectively extract comprises the processor being configured to provide a context-dependent selectable menu of the user-specific catalogs within the aggregated user-specific catalogs activated by navigation to a site associated with a user-specific catalog of user activity information of the first user;

translate the selectively extracted user activity information into a plurality of product or service recommendations for delivery to the first user;

filter the plurality of product or service recommendations based on a location of the first user; and distribute a content feed representing at least a portion of the user-specific catalog of user activity information of the first user to other users in the set of users based on preferences of the first user.

56. A system for generating context-sensitive content feeds from a shared database of user activity, comprising:

means for interfacing to a set of users; and means for processing data, communicating with the set of users via the means for interfacing, the means for processing data being configured to:

capture a user-specific catalog of user activity information for each user in the set of users, wherein each user-specific catalog of user activity information includes commercial information that characterizes services and/or products that have been transacted by a user associated with the user-specific catalog or services and/or products that are of interest to the user;

aggregate user-specific catalogs of user activity information for the set of users in a database;

receive context-dependent information associated with network usage or a location of a first user;

selectively extract, from the aggregated user-specific catalogs based on the context-dependent information, user activity information that matches a product or service description designated by the first user from the commercial information for one or more user-specific catalogs of one or more other users that belong to at least one group of users in the set of users, wherein the means for processing data being configured to selectively extract comprises the means for processing data being configured to provide a context-dependent selectable menu of the user-specific catalogs within the aggregated user-specific catalogs activated by navigation to a site associated with a user-specific catalog of user activity information of the first user;

translate the selectively extracted user activity information into a plurality of product or service recommendations for delivery to the first user;

filter the plurality of product or service recommendations based on a location of the first user; and distribute a content feed representing at least a portion of the user-specific catalog of user activity information of the first user to other users in the set of users based on preferences of the first user.

57. A non-transitory computer-readable medium comprising:

at least one instruction for causing a computer to capture a user-specific catalog of user activity information for each user in a set of users, wherein each user-specific catalog of user activity information includes commercial information that characterizes services and/or products that have been transacted by a user associated with the user-specific catalog or services and/or products that are of interest to the user;

at least one instruction for causing the computer to aggregate user-specific catalogs of user activity information for the set of users in a database;

at least one instruction for causing the computer to receive context-dependent information associated with network usage or a location of a first user;

at least one instruction for causing the computer to selectively extract, from the aggregated user-specific catalogs based on the context-dependent information, user activity information that matches a product or service description designated by the first user from the commercial information for one or more user-specific catalogs of one or more other users that belong to at least one group of users in the set of users, wherein the at least one instruction for causing the computer to selectively extract comprises at least one instruction for causing the computer to provide a context-dependent selectable menu of the user-specific catalogs within the aggregated user-specific catalogs activated by navigation to a site associated with a user-specific catalog of user activity information of the first user;

at least one instruction for causing the computer to translate the selectively extracted user activity information into a plurality of product or service recommendations for delivery to the first user;

at least one instruction for causing the computer to filter the plurality of product or service recommendations based on a location of the first user; and at least one instruction for causing the computer to distribute a content feed representing at least a portion of the user-specific catalog of user activity information of the first user to other users in the set of users based on preferences of the first user.

58. A method of receiving context-sensitive content feeds from a shared database of user activity in a device, comprising:

capturing a user-specific catalog of user activity information for a first user of the device;

communicating the user-specific catalog of user activity information for the first user of the device to a database for aggregation with a set of user-specific catalogs of user activity information for a set of users in the database, wherein each user-specific catalog of user activity information includes commercial information that characterizes services and/or products that have been transacted by a user associated with the user-specific catalog or services and/or products that are of interest to the user;

receiving context-dependent information associated with network usage or a location of the first user;

selectively extracting, from the set of user-specific catalogs based on the context-dependent information, user activity information that matches a product or service description designated by the first user from the commercial information for one or more user-specific catalogs of one or more other users that belong to at least one group of users in the set of users, and using the selectively extracted user activity information to generate a plurality of product or service recommendations directed to the first user, wherein the selectively extracting comprises providing a context-dependent selectable menu of user-specific catalogs within the aggregated user-specific catalogs activated by navigation to a site associated with a user-specific catalog of user activity information for the first user;

filtering the plurality of product or service recommendations based on a location of the first user; and receiving a content feed representing at least a portion of a user-specific catalog of user activity information of another user of the set of users based on preferences of the other user.

59. The method of claim 58, wherein the context-dependent information comprises at least one of network navigation information, or user location information for the first user.

60. A device, comprising:

a communications interface to a database; and a processor, communicating with the database via the communications interface, the processor being configured to:

capture a user-specific catalog of user activity information for a first user of the device;

communicate the user-specific catalog of user activity information for the first user of the device to the database for aggregation with a set of user-specific catalogs of user activity information for a set of users in the database, wherein each user-specific catalog of user activity information includes commercial information that characterizes services and/or products that have been transacted by a user associated with the user-specific catalog or services and/or products that are of interest to the user;

receive context-dependent information associated with network usage or location of the first user;

selectively extract, from the set of user-specific catalogs based on the context-dependent information, user activity information that matches a product or service description designated by the first user from the commercial information for one or more user-specific catalogs of one or more other users that belong to at least one group of users in the set of users, and using the selectively extracted user activity information to generate a plurality of product or service recommendations directed to the first user, wherein the processor being configured to selectively extract comprises the processor being configured to provide a context-dependent selectable menu of user-specific catalogs within the aggregated user-specific catalogs activated by navigation to a site associated with a user-specific catalog of user activity information for the first user;

filter the plurality of product or service recommendations based on a location of the first user; and receive a content feed representing at least a portion of a user-specific catalog of user activity information of another user of the set of users based on preferences of the other user.

61. The device of claim 60, wherein the context-dependent information comprises at least one of network navigation information, or user location information for the first user.

62. A device, comprising:

means for interfacing to a database; and means for processing data, communicating with the database via the means for interfacing, the means for processing data being configured to:

capture a user-specific catalog of user activity information for a first user of the device;

communicate the user-specific catalog of user activity information for the first user of the device to the database for aggregation with a set of user-specific catalogs of user activity information for a set of users in the database, wherein each user-specific catalog of user activity information includes commercial information that characterizes services and/or products that have been transacted by a user associated with the user-specific catalog or services and/or products that are of interest to the user;

receive context-dependent information associated with network usage or location of the first user;

selectively extract, from the set of user-specific catalogs based on the context-dependent information, user activity information that matches a product or service description designated by the first user from the commercial information for one or more user-specific catalogs of one or more other users that belong to at least one group of users in the set of users, and using the selectively extracted user activity information to generate a plurality of product or service recommendations directed to the first user, wherein the means for processing data being configured to selectively extract comprises the means for processing data being configured to provide a context-dependent selectable menu of user-specific catalogs within the aggregated user-specific catalogs activated by navigation to a site associated with a user-specific catalog of user activity information for the first user;

filter the plurality of product or service recommendations based on a location of the first user; and receive a content feed representing at least a portion of a user-specific catalog of user activity information of another user of the set of users based on preferences of the other user.

63. The device of claim 62, wherein the context-dependent information comprises at least one of network navigation information, or user location information for the first user.

64. A non-transitory computer-readable medium comprising:

at least one instruction for causing a computer to capture a user-specific catalog of user activity information for a first user of a device;

at least one instruction for causing the computer to communicate the user-specific catalog of user activity information for the first user of the device to a database for aggregation with a set of user-specific catalogs of user activity information for a set of users in the database, wherein each user-specific catalog of user activity information includes commercial information that characterizes services and/or products that have been transacted by a user associated with the user-specific catalog or services and/or products that are of interest to the user;

at least one instruction for causing the computer to receive context-dependent information associated with network usage or location of the first user;

at least one instruction for causing the computer to selectively extract, from the set of user-specific catalogs based on the context-dependent information, user activity information that matches a product or service description designated by the first user from the commercial information for one or more user-specific catalogs of one or more other users that belong to at least one group of users in the set of users, and using the selectively extracted user activity information to generate a plurality of product or service recommendations directed to the first user, wherein the at least one instruction for causing the computer to selectively extract comprises at least one instruction for causing the computer to provide a context-dependent selectable menu of user-specific catalogs within the aggregated user-specific catalogs activated by navigation to a site associated with a user-specific catalog of user activity information for the first user;

at least one instruction for causing the computer to filter the plurality of product or service recommendations based on a location of the first user; and at least one instruction for causing the computer to receive a content feed representing at least a portion of a user-specific catalog of user activity information of another user of the set of users based on preferences of the other user.

65. The non-transitory computer-readable medium of claim 64, wherein the context-dependent information comprises at least one of network navigation information, or user location information for the first user.

* * * * *